US011523562B2

(12) United States Patent
Randall

(10) Patent No.: US 11,523,562 B2
(45) Date of Patent: Dec. 13, 2022

(54) HAY BALER

(71) Applicant: Randi B. Farm, LLC, Bloomfield, NY (US)

(72) Inventor: John B. Randall, Bloomfield, NY (US)

(73) Assignee: RANDI B. FARM, LLC, Bloomfield, NY (US)

( * ) Notice: Subject to any disclaimer, the term of this patent is extended or adjusted under 35 U.S.C. 154(b) by 146 days.

(21) Appl. No.: 16/650,352

(22) PCT Filed: Sep. 25, 2018

(86) PCT No.: PCT/US2018/052665
§ 371 (c)(1),
(2) Date: Mar. 24, 2020

(87) PCT Pub. No.: WO2019/060896
PCT Pub. Date: Mar. 28, 2019

(65) Prior Publication Data
US 2021/0195841 A1 Jul. 1, 2021

Related U.S. Application Data

(60) Provisional application No. 62/562,860, filed on Sep. 25, 2017.

(51) Int. Cl.
*A01F 15/08* (2006.01)
*A01F 15/10* (2006.01)

(52) U.S. Cl.
CPC .......... *A01F 15/0825* (2013.01); *A01F 15/10* (2013.01); *A01F 15/101* (2013.01)

(58) Field of Classification Search
CPC ...... A01F 15/08; A01F 15/0825; A01F 15/10; A01F 15/106; A01F 15/101; A01F 2015/102; A01F 2015/103; A01F 2015/105; A23N 7/00; A23N 7/02; B65G 21/08; B65G 21/2072
See application file for complete search history.

(56) References Cited

U.S. PATENT DOCUMENTS

| | | | | |
|---|---|---|---|---|
| 2,122,052 A | * | 6/1938 | Bell | A01D 61/02 474/240 |
| 2,381,620 A | * | 8/1945 | Russell | A01F 15/101 56/14.7 |

(Continued)

OTHER PUBLICATIONS

Int'l Search Report dated Nov. 30, 2018 in Int'l Application No. PCT/US2018/052665.

*Primary Examiner* — Jimmy T Nguyen
(74) *Attorney, Agent, or Firm* — Panitch Schwarze Belisario & Nadel LLP

(57) ABSTRACT

A hay baler includes a compression stage having a first major wall conveying device, a support surface, a first sidewall conveying device and a second sidewall conveying device which are arranged to form a compression chamber and driven at compatible speeds to propel hay toward a downstream end of the compression stage. The first and second major wall conveying devices are in spaced relation to each other. The first and second sidewall conveying devices are transversely oriented and form first and second side walls of the compression chamber and are angled so that the compression chamber tapers from an initial width at the upstream end to a smaller final width at the downstream end.

18 Claims, 17 Drawing Sheets

(56) References Cited

U.S. PATENT DOCUMENTS

| | | | | |
|---|---|---|---|---|
| 2,497,641 | A | * | 2/1950 | Vutz ................ A01F 15/08 |
| | | | | 100/6 |
| 2,592,932 | A | * | 4/1952 | McClellan .......... A01F 15/101 |
| | | | | 100/189 |
| 2,696,777 | A | | 12/1954 | Sutch |
| 3,059,569 | A | | 10/1962 | Nolt |
| 3,426,672 | A | | 2/1969 | Nolt |
| 3,554,117 | A | * | 1/1971 | Goldkuhle .......... B30B 9/3089 |
| | | | | 100/269.06 |
| 4,444,096 | A | | 4/1984 | Silvestrini et al. |
| 6,227,468 | B1 | * | 5/2001 | De Baat ............ A01F 29/005 |
| | | | | 241/200 |
| 9,788,488 | B2 | * | 10/2017 | Bertino ............ A01D 51/002 |
| 2005/0178643 | A1 | * | 8/2005 | Simoens ............ B65G 21/08 |
| | | | | 198/823 |
| 2011/0023442 | A1 | * | 2/2011 | Herron ............ A01F 15/106 |
| | | | | 56/341 |
| 2014/0345244 | A1 | * | 11/2014 | Olander ............ A01F 15/106 |
| | | | | 56/341 |
| 2015/0189836 | A1 | * | 7/2015 | Verhaeghe .......... A01F 15/101 |
| | | | | 56/341 |

\* cited by examiner

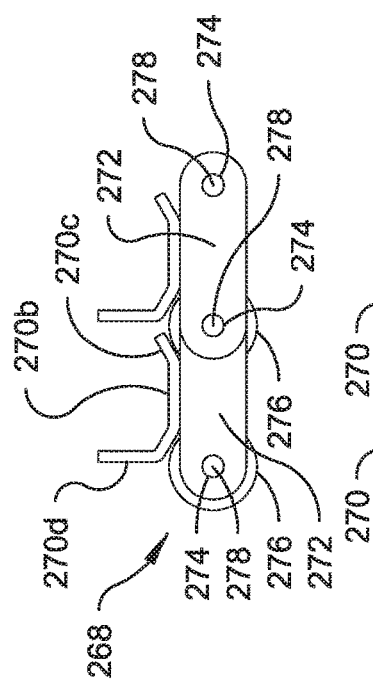
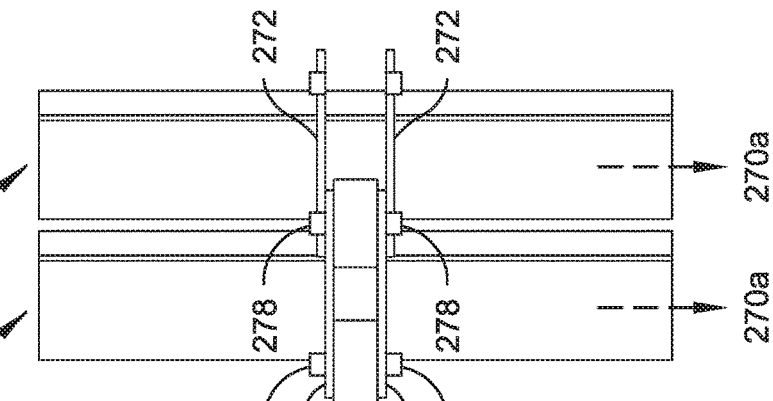
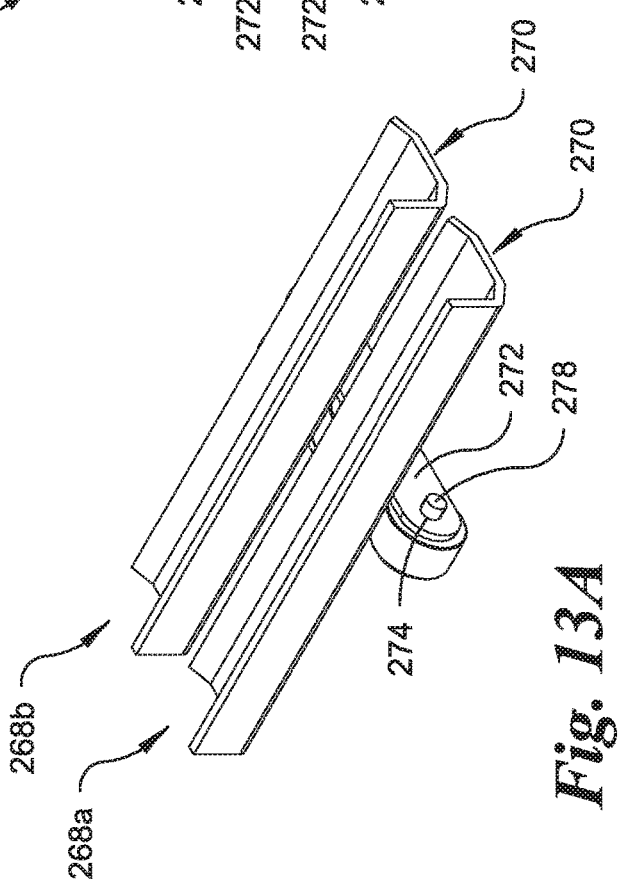

HAY BALER

CROSS-REFERENCE TO RELATED APPLICATIONS

This application is a Section 371 of International Application No. PCT/US2018/052665, filed Sep. 25, 2018, which was published in the English language on Mar. 28, 2019 under International Publication No. WO 2019/060896 A1, which claims the benefit of U.S. Patent Application No. 62/562,860, filed on Sep. 25, 2017; and the disclosures of each application cited in this paragraph are incorporated herein by reference.

BACKGROUND OF THE INVENTION

The present invention relates generally to the field of crop processing, and more particularly, to baling of hay, straw, and similar crops, as well as leaves, rags, trash, garbage or other material capable of being tied into bales, all such materials being collectively referenced herein as "hay."

In some devices, the baling of hay includes a pre-compression stage and a compression stage. In some such devices, in a pre-compression stage, hay is gathered and pre-compressed, with the objective, not always met, to provide a reasonably uniform and predictable mass of hay to the compression stage, which then compresses the hay and supplies it to a baling stage for sizing and binding.

The present invention comprises a new hay baler, with certain embodiments providing various advantages. In operation, hay entering the baler is of unknown density and of unknown consistency, side to side, across the width of the baler. The hay also varies by volume depending on crop conditions or other factors, including the forward speed of the baler. In an exemplary embodiment of the present invention, the hay baler compensates for variance of the hay entering the baler in order to supply the compression stage with a reasonably consistent density of hay in a continuous baling process.

SUMMARY OF THE DISCLOSURE

Briefly stated, a hay baler includes a compression stage having an upstream end and a downstream end and including a first major wall conveying means, a second major wall conveying means, a first sidewall conveying means, and a second sidewall conveying means. The first major wall conveying means, the second major wall conveying means, the first sidewall conveying means, and the second sidewall conveying means are arranged to form a compression chamber having an upstream end and a downstream end. The first major wall conveying means is adapted to propel hay and driven to propel hay from the upstream end of the compression chamber to the downstream end. The second major wall conveying means is adapted to propel hay and driven to propel hay from the upstream end of the compression chamber to the downstream end. The first major wall conveying means is in spaced relation to the second major wall conveying means. The first sidewall conveying means is transversely oriented and forms a first side wall of the compression chamber and is driven to propel hay from the upstream end of the compression chamber to the downstream end. The second sidewall conveying means is transversely oriented and forms a second side wall of the compression chamber and is driven to propel hay from the upstream end of the compression chamber to the downstream end. The first sidewall conveying means and the second sidewall conveying means are angled so that the compression chamber tapers from an initial width at the upstream end of the compression chamber to a smaller final width at the downstream end. The first major wall conveying means, the second major wall conveying means, the first sidewall conveying means, and the second sidewall conveying means are driven at compatible speeds to cooperate to accept hay introduced into the upstream end of the compression stage and to discharge the hay in a compressed form from the downstream end of the compression stage.

In certain embodiments, the first major wall conveying means includes a plurality of rollers oriented in a plane, each roller being adapted to propel hay and driven to propel hay from the upstream end of the compression chamber to the downstream end. The second major wall conveying means comprises a plurality of rollers oriented in a plane, each roller being adapted to propel hay and driven to propel hay from the upstream end of the compression chamber to the downstream end. The first sidewall conveying means comprises a first sidewall conveyor adapted to propel hay and driven to propel hay from the upstream end of the compression chamber to the downstream end. The second sidewall conveying means comprises a second sidewall conveyor adapted to propel hay and driven to propel hay from the upstream end of the compression chamber to the downstream end. The first sidewall conveyor and the second sidewall conveyor are angled so that the compression chamber tapers from an initial width at the upstream end to a smaller final width at the downstream end. The rollers of the first major sidewall conveying means, the rollers of the second major sidewall conveying means, the first sidewall conveyor, and the second sidewall conveyor are driven at compatible speeds to cooperate to accept hay introduced into the upstream end of the compression stage and to discharge the hay in a compressed form from the downstream end of the compression stage.

In certain embodiments, at least one roller includes a cylindrical body with a plurality of axial blades extending radially outwardly therefrom.

In certain embodiments, the rollers of the first major wall conveying means are mounted in closely spaced relation to form an essentially continuous boundary of the compression chamber through which boundary little hay escapes.

In certain embodiments, at least one of the conveyors includes a plurality of links joined together to form a chain, with each link including a body having a base, a minor leg angled with respect to the base, and a major leg angled with respect to the base.

In certain embodiments, at least one of the conveyors is held in a shape having a pressure side facing the compression chamber, and the pressure side of the conveyor is supported by a pressure track.

A hay baler includes a density-control stage having an upstream end and a downstream end and including a frame having a base and two spaced-apart parallel frame elements attached to the base, a first density-control assembly, a second density-control assembly, a first transfer assembly, a second transfer assembly, and a density-control chamber formed by a space between the first density-control assembly and the second density-control assembly and having an upstream end and a downstream end. The first density-control assembly includes a first transverse arm-support member supporting a plurality of density-control arms, each density-control arm being pivotably mounted to the first transverse arm-support member and having a hay-contact surface facing the density-control chamber; a biasing member disposed to provide a force in response to a movement of the density-control arm; and a means for propelling hay toward the downstream end of the density-control chamber. The second density-control assembly includes a second transverse arm-support member supporting a plurality of density-control arms, each density-control arm being pivotably mounted to the second transverse arm-support member and having a hay-contact surface facing the density-control chamber; a biasing member disposed to provide a force in response to a movement of the density-control arm, and a means for propelling hay toward the downstream end of the density-control chamber. The first transfer assembly includes a third transverse arm-support member supporting a plurality of transfer arms, each transfer arm being pivotably mounted to the third transverse arm-support member, and a means for propelling hay toward the compression stage. The second transfer assembly includes a fourth transverse arm-support member supporting a plurality of transfer arms, each of the transfer arms being pivotably mounted to the fourth transverse arm-support member, and a means for propelling hay toward the compression stage. The hay baler further includes a detector configured to detect a datum indicative of a volume and a density of hay in the density-control chamber and operatively connected to at least one transfer assembly to cause the transfer assembly to operate at a selected speed corresponding to the datum.

In certain embodiments, the hay baler includes a density-control stage operatively connected to the upstream end of a compression stage, the density-control stage having an upstream end and a downstream end and including a frame having a base and two spaced-apart parallel frame elements attached to the base, a first density-control assembly, a second density-control assembly, a first transfer assembly, a second transfer assembly, and a density-control chamber formed by a space between the first density-control assembly and the second density-control assembly and having an upstream end and a downstream end. The first density-control assembly includes a first transverse arm-support member supporting a plurality of density-control arms, each density-control arm being pivotably mounted to the first transverse arm-support member and having a hay-contact surface facing the density-control chamber; a biasing member disposed to provide a force in response to a movement of the density-control arm; and a means for propelling hay toward the downstream end of the density-control chamber. The second density-control assembly includes a second transverse arm-support member supporting a plurality of density-control arms, each density-control arm being pivotably mounted to the second transverse arm-support member and having a hay-contact surface facing the density-control chamber; a biasing member disposed to provide a force in response to a movement of the density-control arm, and a means for propelling hay toward the downstream end of the density-control chamber. The first transfer assembly includes a third transverse arm-support member supporting a plurality of transfer arms, each transfer arm being pivotably mounted to the third transverse arm-support member, and a means for propelling hay toward the compression stage. The second transfer assembly includes a fourth transverse arm-support member supporting a plurality of transfer arms, each of the transfer arms being pivotably mounted to the fourth transverse arm-support member, and a means for propelling hay toward the compression stage. The hay baler further includes a detector configured to detect a datum indicative of a volume and a density of hay in the density-control chamber and operatively connected to at least one transfer assembly to cause the transfer assembly to operate at a selected speed corresponding to the datum.

In certain embodiments, the hay baler includes at least one frame biasing member operatively connected to at least one of the first exterior member, the second exterior member, the third exterior member, and the fourth exterior member.

In certain embodiments, a first frame biasing member is operatively connected to at least one of the first exterior member and the second exterior member and to a structure providing support, is attached to the first transverse tying member, and includes a first rod having a first end and a second end and a spring held between the first end and the first transverse tying member by a nut threadedly engaging the first rod. A second frame biasing member is operatively connected to at least one of the third exterior member and the fourth exterior member and to a structure providing support, is attached to the second transverse tying member, and includes a second rod having a first end and a second end and a spring held between the second end and the second transverse tying member by a nut threadedly engaging the second rod.

In certain embodiments, the first density-control assembly includes a plurality of rotating fingers that are alternately locked in an outward orientation for a portion of a revolution and alternately unlocked to rotate freely in order to propel hay toward the rear end of the compression chamber. The second density-control assembly includes a plurality of rotating fingers that are alternately locked in an outward orientation for a portion of a revolution and alternately unlocked to rotate freely in order to propel hay toward the rear end of the compression chamber. The first transfer assembly includes a plurality of rotating fingers that are alternately locked in an outward orientation for a portion of a revolution and alternately unlocked to rotate freely in order to propel hay toward the rear end of the compression chamber. The second transfer assembly includes a plurality of rotating fingers that are alternately locked in an outward orientation for a portion of a revolution and alternately unlocked to rotate freely in order to propel hay toward the rear end of the compression chamber.

BRIEF DESCRIPTION OF THE SEVERAL VIEWS OF THE DRAWINGS

The foregoing summary, as well as the following detailed description of an example of a device according to the invention, will be better understood when read in conjunction with the appended drawings. For the purpose of illustrating the invention, there are shown in the drawings embodiments which are presently preferred. It should be understood, however, that the disclosure is not limited to the precise arrangements and instrumentalities shown. In the drawings:

FIG. 13A is a perspective view of two links of the conveyor of FIG. 12 of the hay baler of FIG. 1;

FIG. 13B is a top plan view of the links of FIG. 13A of the hay baler of FIG. 1;

FIG. 13C is a side elevational view of the links of FIG. 13A of the hay baler of FIG. 1.

DETAILED DESCRIPTION OF THE INVENTION

Figure 1:
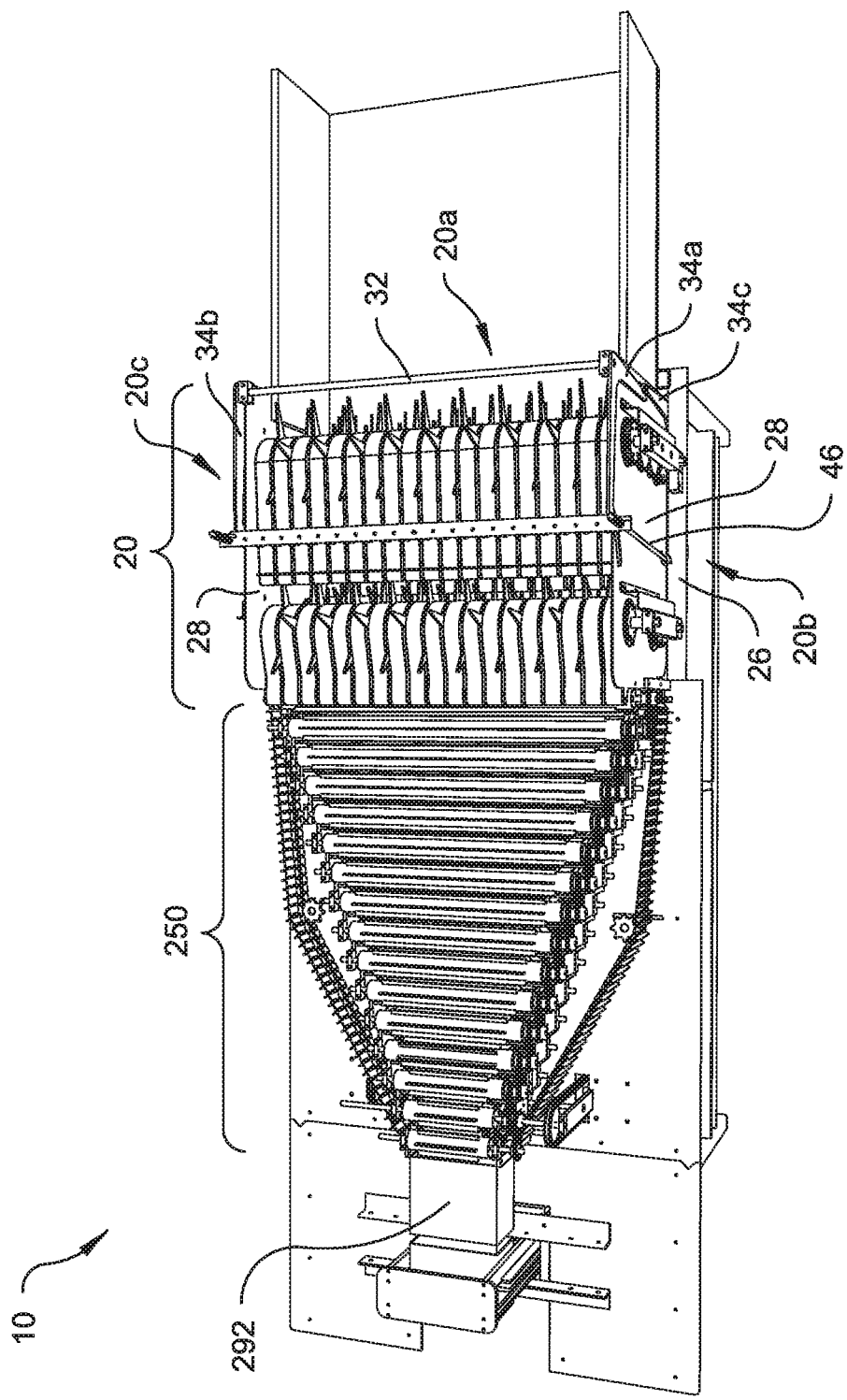
FIG. 1 is an upper perspective view of a preferred embodiment of a hay baler according to the invention.

Certain terminology is used in the following description for convenience only and is not limiting. The words "right," "left," "lower," and "upper" designate directions in the drawings to which reference is made. The words "inner" and "outer" refer to directions toward and away from, respectively, the geometric center of the device and designated parts thereof Unless specifically set forth herein, the terms "a", "an," and "the" are not limited to one element but instead should be read as meaning "at least one." The terminology includes the words noted above, derivatives thereof and words of similar import.

Figure 2:
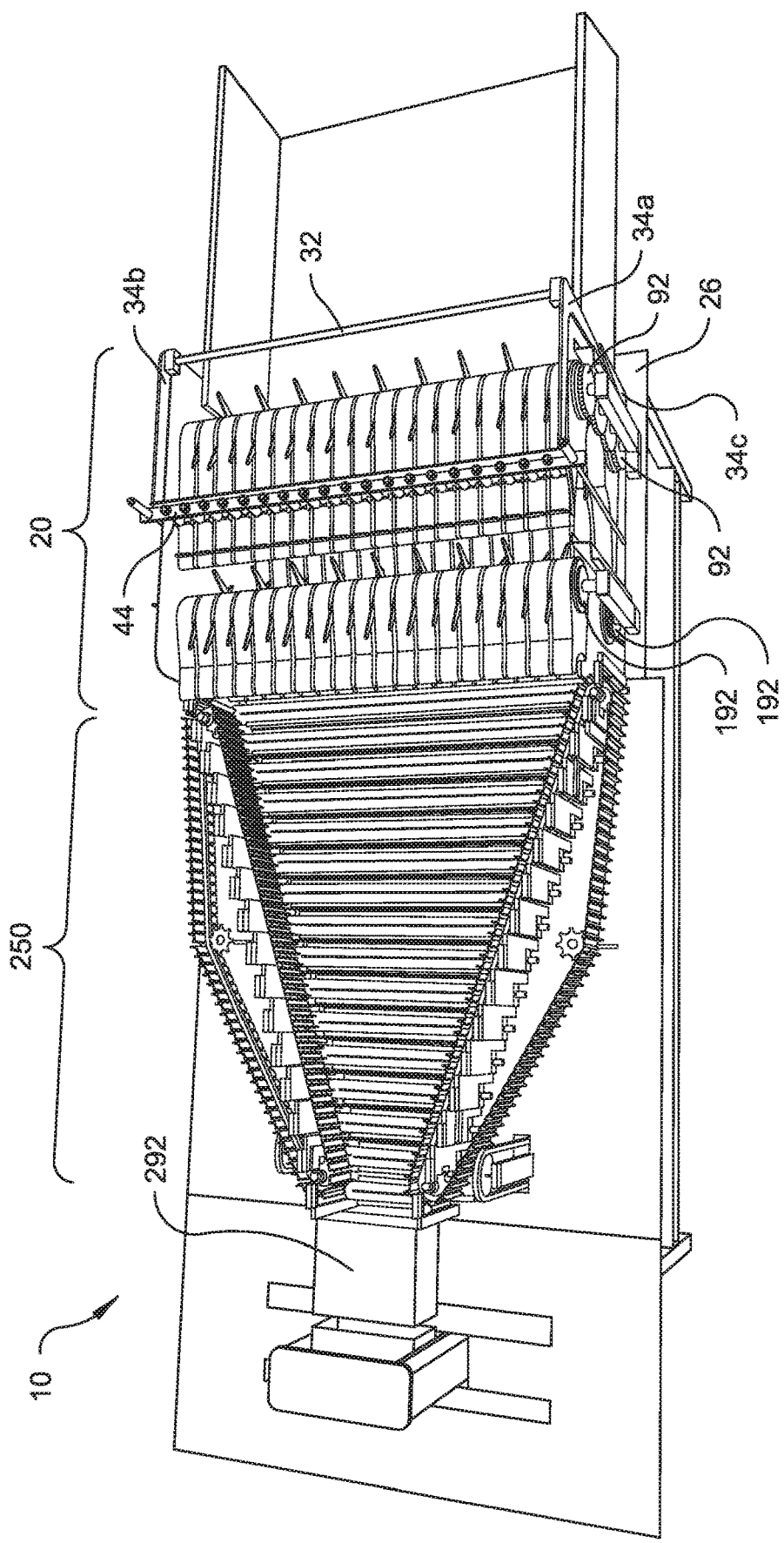
FIG. 2 is a partial upper perspective view of the hay baler of FIG. 1, with an upper set of rollers omitted.
Figure 14:
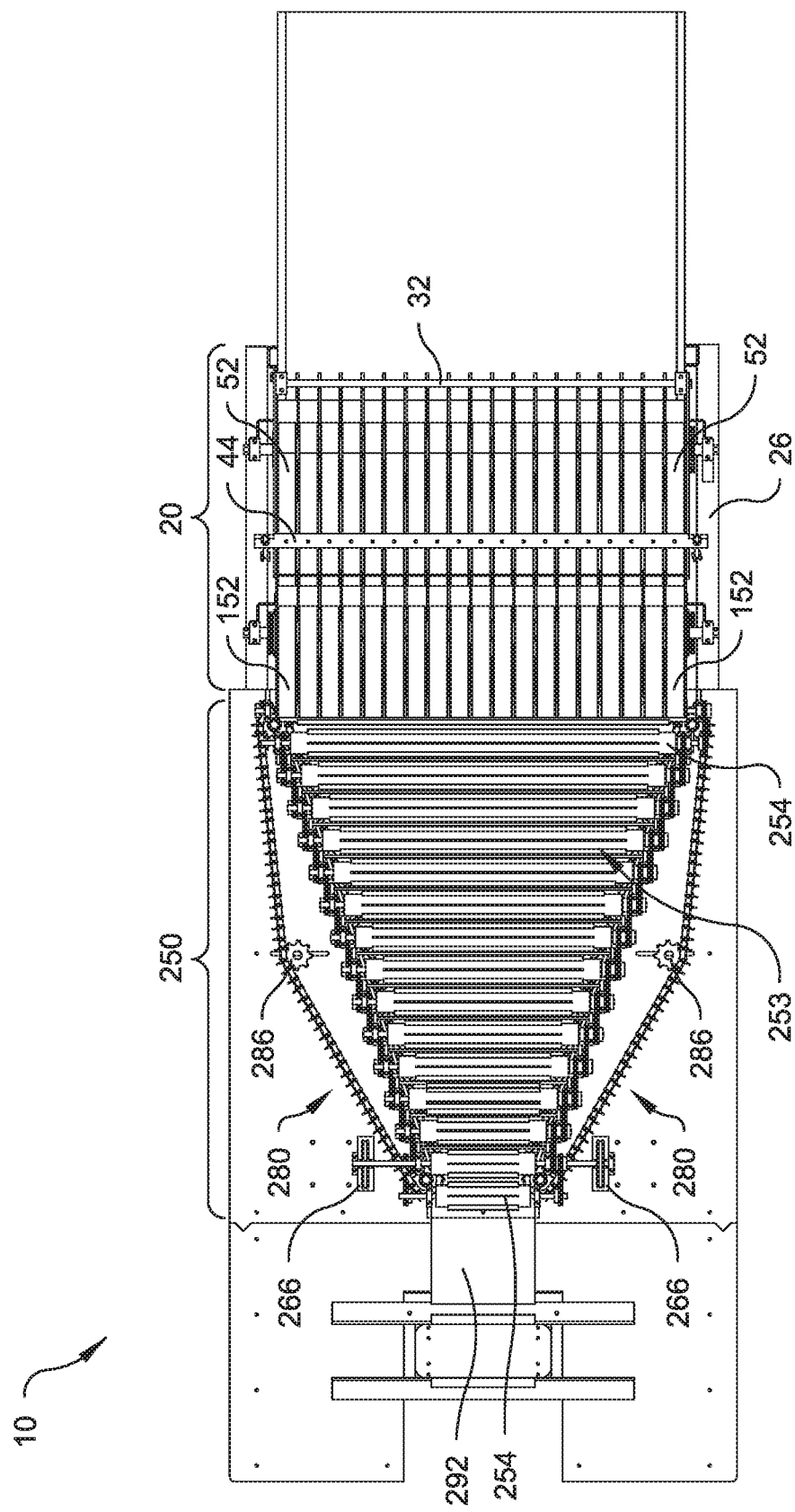
FIG. 14 is a top plan view of the hay baler of FIG. 1.

Referring to FIGS. 1-2 and 14, a preferred embodiment of the present invention is directed to a hay baler 10, including a density-control stage 20 mounted to a base 26, and a compression stage 250. The density-control stage 20 and the compression stage 250 are compatible and optimally work together but may, with proper support, operate independently. The preferred embodiment is described by reference to a preferred orientation of the hay baler 10 with respect to the ground; but the hay baler 10 or portions thereof may take on a different orientation while still lying within the scope of the disclosure and in particular within the scope of the claims.

Figure 3:
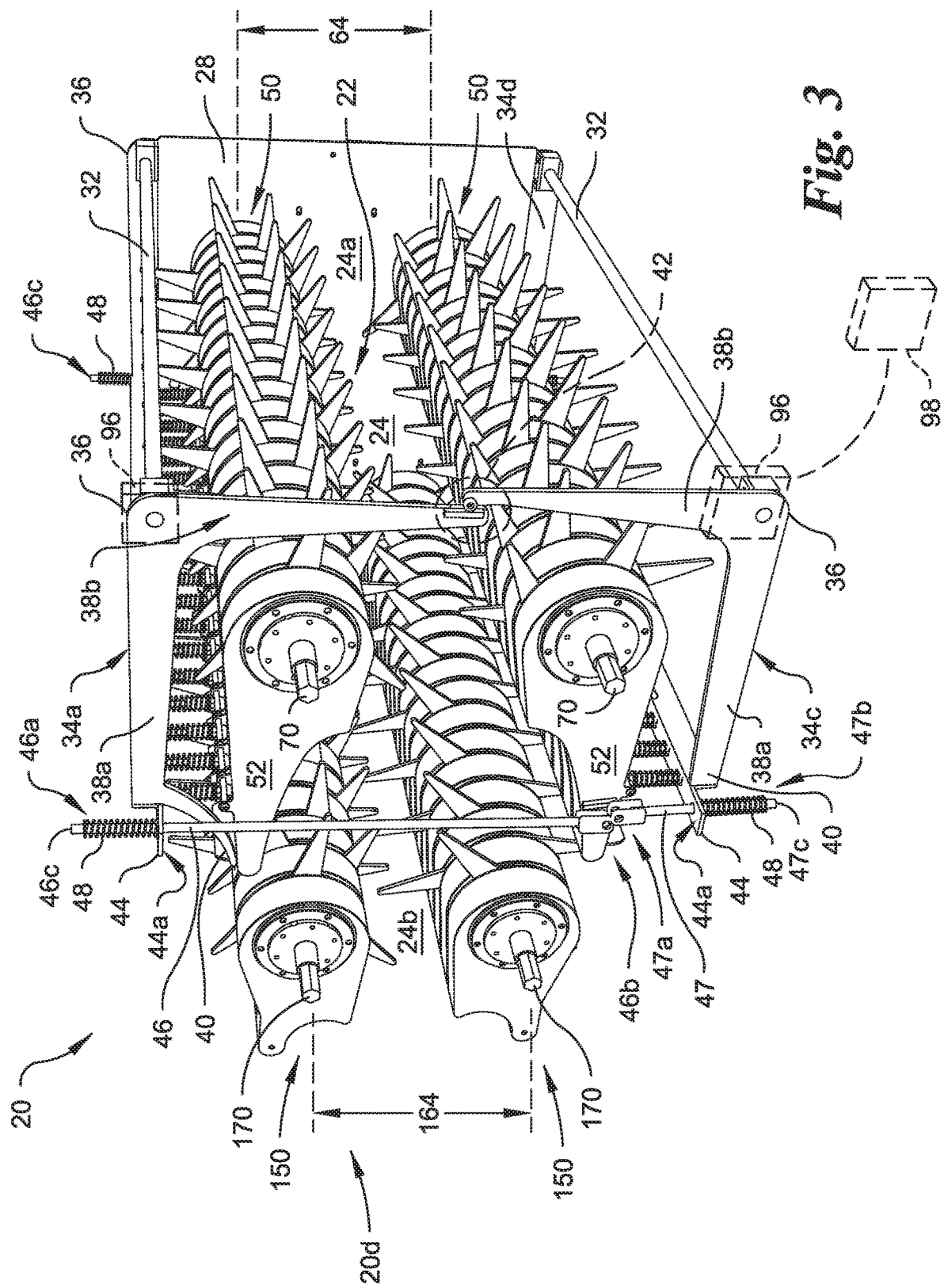
FIG. 3 is a partial left front perspective view of a density-control stage of the hay baler of FIG. 1, with one wall plate omitted.

Referring to FIGS. 1 and 3, the density-control stage 20 has an upstream end 20a and a downstream end 20d, a left side 20b, a right side 20c, and an entry 22 leading to a density-control chamber 24 having an upstream end 24a and a downstream end 24b. The density-control stage 20 has a frame comprising the base 26 and two parallel frame elements in the form of two wall plates 28 attached to the base 26. (See FIG. 1; the left wall plate 28 is omitted in FIG. 3 to allow a view of other components.)

Referring to FIG. 3, disposed perpendicularly with respect to the wall plates 28 are first and second pin members 32 extending transversely to and supported by the parallel frame elements, wall plates 28. The pin members 32 are shown as being round in cross section but may have any convenient shape. Pivotally mounted to the first pin member 32, outwardly of each wall plate 28, are a first exterior member 34a and a second exterior member 34b. Similarly, pivotally mounted to the second pin member 32, externally of each wall plate 28, are a third exterior member 34c and a fourth exterior member 34d. Each exterior member is preferably L-shaped but may be of any convenient shape. Each exterior member 34a, 34b, 34c, 34d has a vertex 36, a first portion 38a extending rearwardly from the vertex 36, and a second portion 38b extending perpendicularly to the first portion. Each exterior member 34a, 34b, 34c, 34d has a rear end portion 40. Referring to FIG. 3, the first exterior member 34a and the third exterior member 34c are preferably connected by a joint providing two degrees of freedom, such as a rolling joint 42, which preferably is configured so that when the first exterior member 34a rotates such that the first portion 38a of the first exterior member 34a is moving closer to the first portion 38a of the third exterior member 34c, the first exterior member 34a exerts a force on the third exterior member 34c tending to rotate the rear end portions 40 of the first and third exterior members 34a, 34c toward one another. Moreover, the rolling joint 42 preferably is configured so that when the first exterior member 34a rotates so that the first portion 38a of the first exterior member 34a is moving farther away from the first portion 38a of the third exterior member 34c, the third exterior member 34c exerts a force on the first exterior member 34a tending to rotate the rear end portions of the first and third exterior members 34a, 34c away from one another. The second exterior member 34b and the fourth exterior member 34d are joined by a rolling joint 42 in the same manner, with the joint 42 configured so that configured so that when the second exterior member 34b rotates such that the first portion 38a of the second exterior member 34b is moving closer to the first portion 38a of the fourth exterior member 34d, the second exterior member 34b exerts a force on the fourth exterior member 34d tending to rotate the rear end portions 40 of the second and fourth exterior members 34b, 34d toward one another. Moreover, the rolling joint 42 preferably is configured so that when the third exterior member 34b rotates so that the first portion 38a of the second exterior member 34b is moving farther away from the first portion 38a of the fourth exterior member 34d, the fourth exterior member 34d exerts a force on the second exterior member 34b tending to rotate the rear end portions of the second and fourth third exterior members 34b, 34d away from one another.

Referring to FIGS. 3-7, the density-control stage 20 includes first and second transverse tying members 44, with each transverse tying member 44 preferably comprising a length of angle iron joined to the rear end portions 40 of the first and second exterior members 34a, 34b on opposite sides of the device and to the third and fourth exterior members 34c, 34d on opposite sides of the density-control stage 20, such that each transverse tying member 44 extends from a rear end portion 40 across a width of the density-control stage 20. The transverse tying member 44 that joins the first and second exterior members 34a, 34b may have a working surface 44a that faces downwardly, and the transverse tying member 44 that joins the third and fourth exterior members 34c, 34d may have a working surface 44a that faces upwardly.

The density-control stage 20 optionally includes at least one frame biasing member operatively connected to at least one of the first exterior member 34a, the second exterior member 34b, the third exterior member 34c, and the fourth exterior member 34d. A first frame biasing member may be operatively connected to at least one of the first exterior member 34a and the second exterior member 34b and to a structure providing support, may be attached to the upper transverse tying member 44, and may include a first rod 46 having a first end 46a and a second end 46b and a spring 48 held between the first end 46a and the upper transverse tying member 44 by a nut 46c threadedly engaging the first rod 46. A second frame biasing member may be operatively connected to at least one of the third exterior member and the fourth exterior member and to a structure providing support, and may be attached to the second transverse tying member 44, and may include a second rod 47 having a first end 47a and a second end 47b and a spring 48 held between the second 47b end and the second transverse tying member 44 by a nut 47c threadedly engaging the second rod 47. As best seen in FIG. 3, for example, on each side of the density-control stage 20, disposed outwardly of each wall plate 28, a rod 47 engages the working surface 44a of the lower transverse tying member 44 and is pivotably attached to the wall plate 28 (and alternatively may be attached to another structure providing support). Each rod 47 has a first end 47a and a second end 47b, with at least one frame biasing member in the form of a spring 48 held between the second end 47b and the working surface 44a of the lower transverse tying member 44 by a nut 47c threadedly engaging the rod 47. Similarly, on each side of the density-control stage 20, disposed outwardly of each wall plate 28, a rod 46 engages the working surface 44a of the transverse tying member 44 and is pivotably attached to the wall plate 28 (and alternatively may be attached to another structure providing support). Each rod 46 has an first end 46a and a second end 46b, with at least one frame biasing member in the form of a spring 48 held between the second end 46b and the working surface 44a of the lower transverse tying member 44 by a nut 46c threadedly engaging the rod 46. The springs 48 are disposed to resist a vertical movement of the vertical rods 46, 47 relative to the transverse tying members 44. The amount of resistance to movement may be fine-tuned by adjusting the tightness of the nuts 46c, 47c.

The density-control stage 20 comprises a first density-control assembly 50 (shown as the upper density-control assembly in the drawings) and a second density-control assembly 50 (depicted as the lower assembly in the drawings). Each density-control assembly 50 comprises a plurality of members that function together to control the density and quantity of hay that is supplied to the compression stage 250 to be compressed before being ultimately ejected from the compression stage 250 for sizing and tying into bales.

Referring to FIGS. 3 through 6, each density-control assembly 50 comprises a fixed transverse arm-support member in the form of a hexagonal shaft 70 extending horizontally between the two vertical frame elements in the form of the two wall plates 28 (or alternatively passing through and supported by the two wall plates 28). Each shaft 70 of each density-control assembly 70 supports a plurality of density-control arms 52, each density-control arm 52 being pivotably mounted to the first transverse arm-support member, the hexagonal shaft 70, and having a hay-contact surface 60 facing the density-control chamber 24. Each density-control assembly 50 also includes a biasing member, in the present embodiment a plurality of springs 66, disposed to provide a force in response to the movement of at least one of the density-control arms 52, preferably one spring 66 for each density-control arm 52. Note that although the wall plates 28 are included in the depicted embodiment, different vertical frame elements could be substituted for the wall plates 28 and attached to the hexagonal shaft 70 in any suitable means.

Also, the hexagonal shafts 70 could be replaced by fixed transverse arm-support members having other cross-sectional shapes, such as square, octagonal or oval, or even round.

Each density-control assembly 50 includes a means for propelling hay toward the downstream end 24b of the density-control chamber 24. Each hexagonal shaft 70 has a plurality of cam plates 72 mounted at intervals thereon. Each cam plate 72 has a hexagonal aperture 74 that prevents the cam plate 72 from rotating relative to the hexagonal shaft 70. If alternative fixed transverse members are used, the aperture 74 is adapted to the shape of the alternative transverse member. Each cam plate 72 has an outer edge 76 and an inner edge 78. The outer edge 76 is preferably oriented toward the front side 20a of the density-control stage 20 and extends about one-third of the circumference of the cam plate 72; the inner edge 78 is preferably oriented toward the rear side 20d of the density-control stage 20 and encompasses about two-thirds of the circumference of the cam plate 72. Adjacent to each cam plate 72 is a cylindrical inner bushing 82, which is non-rotatably mounted on the shaft 70. A cylindrical carrier 86 is rotatably mounted on the inner bushing 82. The carrier 86 has a plurality of holes 88 passing therethrough. In the depicted embodiment, there are six holes 88, but other numbers of holes may be selected. Each density-control arm 52 has a housing 54 with a cylindrical opening 56 that slidably accommodates a body 86.

The holes 88 of each carrier 86 are engaged by six tie rods 90, which are engaged and driven by a drive wheel 92 to revolve about the shaft 70 at a distance from the inner bushing 82 (and thus at a distance from the shaft 70), so that all of the carriers 86 of a given density-control assembly 50 rotate together. Associated with each carrier 86, aligned with each cam 72, are a plurality of rotating fingers 94 (three are depicted), each having a hole 94a rotatably engaged with one of the tie rods 90. Each finger 94 also has a follower surface 94b. As each finger 94 revolves about the shaft 70, the follower surface 94b alternately engages the outer edge 76 of the cam plate 72 and then becomes disengaged when the follower surface 94b passes adjacent the inner edge 78, with the result that the finger 94 is alternately locked in an outward orientation and then allowed to rotate freely on the tie rod 90. The finger 94 thus is locked and propels hay from the entry 22 toward the rear end 24b of the density-control chamber 24, while the finger 94 rotates freely to avoid driving hay from the density-control chamber 24 back toward the entry 22. The cam plate 72 has a notch 72a near a leading end of the outer edge 76. The notch 72a engages a corner 94c of the finger 94 to rotate the follower surface 94b to engage with the outer edge 76.

Each density-control arm 52 has a protrusion 58 extending in a downstream direction toward the downstream end 24b of the density-control chamber 24. Each density-control arm 52 has a hay-contact surface 60 facing the density-control chamber 24. In the preferred embodiment depicted, each density-control arm 52 has a support link 62 having a first end 62a pivotably attached to the protrusion 58 and a second end 62b, which threadedly engages a nut or cap 62c for securing the support link to the transverse tying member 44. Each support link 62 carries a biasing member, in this preferred example a coil spring 66, also secured at a first end 66a thereof to the protrusion 58 and at a second end 66b to one of the upper and lower transverse tying members 44 and disposed to exert a force opposing a relative movement between the protrusion 58 and the transverse tying member 44. Alternatively, the biasing member may be another type of spring (including a leaf spring or an air spring), or any device capable of providing a biasing force and otherwise suitable to the application. In an alternative preferred embodiment, the support member 62 and spring 66 are replaced by an element capable of acting as both a support link and a biasing member for example, a load cell, a hydraulic cylinder, or a cylinder containing an air spring.

Continuing to refer to FIGS. 3-7, two density-control assemblies 50 preferably may be mounted in alignment and spaced by a first offset distance 64, which is most conveniently measured between the centers of the hexagonal shafts 70 (though other reference points common to both density-control assemblies 50 may be used). Each density-control assembly 50 comprises a hexagonal shaft 70 with a plurality of cam plates 72, inner bushings 82, carriers 86, tie rods 90 driven by a drive wheel 92 (see FIG. 2), and fingers 94, all as described above. The space between the two density-control assemblies 50 forms the entry 22 of the collecting chamber 24.

The density-control stage 20 further comprises a first and a second transfer assembly 150 located rearwardly from the density-control assemblies 50, each having a hay-contact surface 160. The first transfer assembly 150 includes a third transverse arm-support member in the form of a hexagonal shaft 170, and the second transfer assembly includes a fourth transverse arm-support member in the form of a hexagonal shaft 170. The hexagonal shafts 170 could be replaced by fixed transverse arm-support members having other cross-sectional shapes, such as square, octagonal or oval, or even round. Each hexagonal shaft 170 in turn supports a plurality of transfer arms 152, each transfer arm bring pivotably mounted to the hexagonal shaft 170, and a means for propelling hay toward the compression stage 250. Each transfer assembly 150 comprises the hexagonal shaft 170 with a plurality of cam plates, inner bushings (not shown), carriers 186, tie rods 190, and fingers 194, which act in combination, when activated, to propel hay from the density-control chamber 24 rearwardly to the compression stage 250. For example, each transfer assembly includes a plurality of rotating fingers 194 that are alternately locked in an outward orientation for a portion of a revolution and alternately unlocked to rotate freely in order to propel hay toward the rear end 24b of the compression chamber 24. The configuration of the cam plates, inner bushings, carrier bodies 186, tie rods 190, and fingers 194 is essentially identical to that described above with respect to the density-control assemblies 50. The transfer arms 152 differ from the density-control arms 52 in that the transfer arms 152 preferably lack support members and springs for connection to a transverse member and instead are preferably pinned at a suitable point along a protrusion 158 of the housing 154 of each transfer arm 152.

The space between the two density-control assemblies 50 forms the entry 22 of the density-control chamber 24. In use, the hay baler 10 may be propelled across a field—for example, by towing the base on a wheeled cart (not shown) or may be used as a stationary device, with hay being brought to the hay baler 10 and inserted into the entry 22. When the hay baler 10 is propelled across a field, a pickup device (not shown) supplies hay to the entry 22 of the density-control chamber 24. Due to a variety of factors, in both static and mobile applications, the quantity of hay provided to hay baler 10 generally varies over time and varies across the width of the entry 22. The operation of the density-control stage 20 preferably helps to provide a controlled and reasonably uniform mass of hay to the compression stage 250, the configuration and operation of which are detailed below.

The fingers 194 are driven as described above and propel hay from the density-control chamber 24 into the compressor stage 250. As hay accumulates in the density-control chamber 24, a mass of hay forms. The mass of hay presses against the plurality of hay-contact surfaces 60 of the plurality of density-control arms 52 of the density-control assemblies 50, and each density-control arm 52 pivots on the corresponding carrier 86 in response to a force exerted by the mass of hay. Each density-control arm 52 can pivot within a range independently of the other density-control arms 52 because each density-control arm 52 is separately connected to the corresponding (upper or lower) transverse tying member 44. However, because all of the density-control arms 52 of each density-control assembly 50 are connected to a single transverse tying member 44, the density-control arms 52 of each density-control assembly 50 move in unison, except for the individual variations resulting from differences in the hay mass across the width of the density-control stage 20. This configuration of the density-control assemblies 50 tends to "average out" variations in the hay mass across the width of the density-control stage 20, while accommodating some variation in the density and amount of hay at various locations in the density-control chamber 24 and variations occurring at particular locations over time.

The transfer arms 152 are displaced from one another by a second vertical offset distance 164 (most conveniently measured between the centers of the shafts 170), which is less than the first vertical offset distance 64 and preferably is about fifty percent (50%), or more preferably less than about thirty-three percent (33%), of the first vertical offset distance 64. As hay passes between the transfer arms 152, the hay undergoes a compression before moving into the compression stage 250 for additional compression.

The relative positions of, or the forces being absorbed and/or exerted by, various components of the density-control assemblies 50 may preferably be sensed as a datum and used to adjust the operation of the hay baler 10 to control the volume and density of the hay mass in the density-control chamber 24 and in turn entering the compression stage 250. A detector 96, for example a position sensor, a load cell, or a torque sensor, shown schematically in FIG. 3, detects a pre-selected datum, such as a displacement of, or a force or torque exerted or absorbed by, at least one density-control arm 52, or displacement of, or a force or torque exerted or absorbed by, one of the exterior members 34a, 34b, 34c, 34d, indicative of a volume and density of hay in the density-control chamber 24, and preferably corresponding to the desired volume and density of hay within the density-control chamber 24. The detector 96 is operatively connected at least one transfer assembly 150, and as shown is operatively connected to the drive wheel 192 of the transfer assembly 150 and to the compression stage 250. In the embodiment shown, the detector 96 causes the transfer assembly 150 and the compression stage 250 to be driven at selected compatible speeds (including the same speed) corresponding to the datum measured by the detector 96—for example, a speed dependent upon the pre-selected displacement of at least one of the exterior members 34a, 34b, 34c, 34d, which displacement in turn corresponds to a particular density and volume of hay. For example, a plurality of detectors 96 may also be used in combination to detect the displacement of the two or more of the exterior members 34a, 34b, 34c, 34d and control the speed of operation of the transfer assembly 152 and the compression stage 250. Alternatively, the detector 96 may measure a datum such as a displacement of, or a force or torque exerted or absorbed by one or more other elements of the density-control assemblies 50 and transmit the datum (or a signal corresponding thereto) to a controller 98, with the controller 98 determining the compatible operating speed at which to operate the transfer assemblies 150 and compatible operating speed at which to operate the compression stage 250 based on the measurement or measurements, directly or indirectly causing the transfer assembly 150 and the compression stage 250 to operate at a speed compatible with the density and volume of hay exiting the density-control stage 20.

Figure 3A:
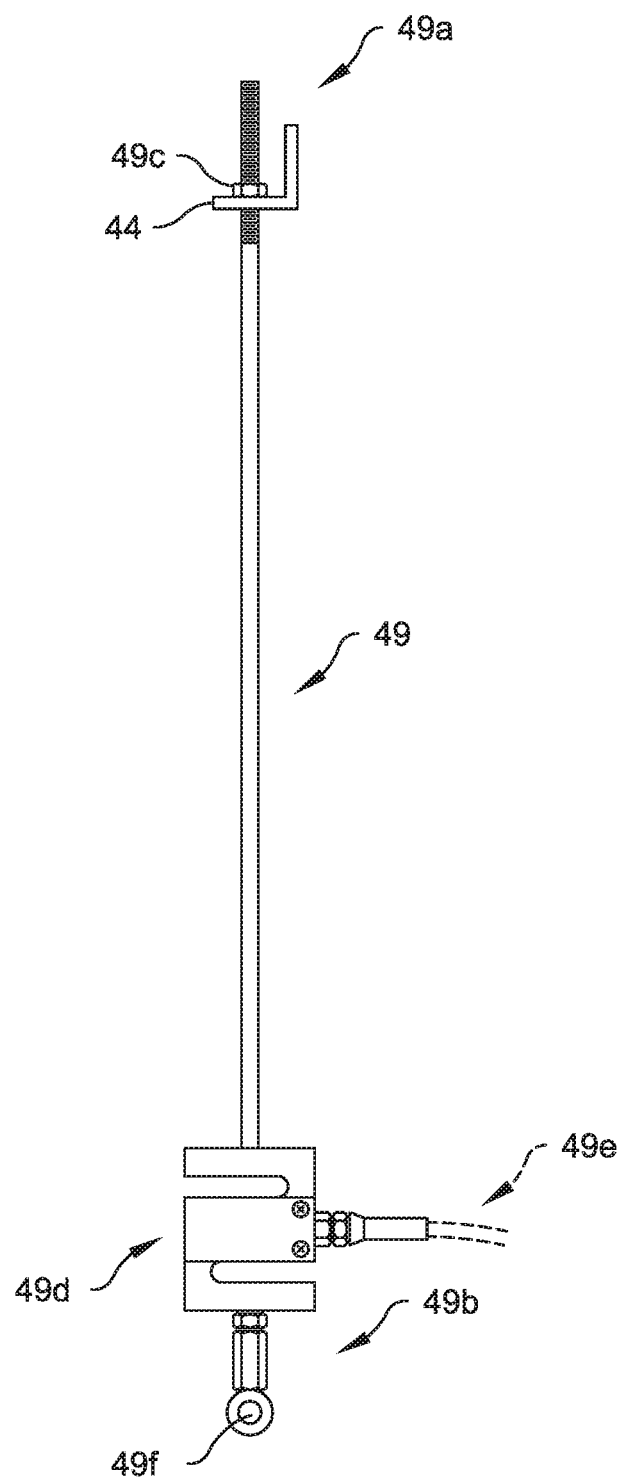
FIG. 3A is a partial left elevational view of a load-cell-carrier rod for use in the density-control stage of FIG. 1.

The density-control stage 20 optionally includes a load cell 49*d*, which may be provided as part of a load-cell-carrier rod 49. The load cell 49*a* may be used as an alternative to, or in addition to, the detector 96 and may be used with or without biasing members (the rods 46 and 47 and related components). Referring to FIG. 3A, a load-cell-carrier rod 49 may be connected to a transverse tying member 44 in place of at least one rod 46, spring 48, and related components (shown in FIG. 3). The load-cell-carrier rod 49 includes a first end 49*a* connected to the transverse tying member 44 and secured with a nut 49*c*. A second end 49*b* has a hole 49*f* for connecting the load-cell-carrier rod 49 to a wall plate 28 (not shown) or other support. The load-cell-carrier rod 49 includes a load cell 49*d* disposed between the first end 49*a* and the second end 49*b*, with the load cell 49*d* including a connector 49*e*, which is shown schematically in FIG. 3A and may include a wired or wireless connection between the load cell 49*d* and the controller 98 or another control device. The output of the load cell 49*d* may determine, or may be used as a datum for determining, the compatible speeds of operation of the transfer assembly 152 and the compression stage 250. The load cell 49*d* may be provided as part of a load-cell-carrier rod 49 as shown, or may alternatively be mounted to the density-control stage 20 at another location at which the load cell 49*d* may measure the force being carried by a particular portion of the density-control stage 20 and thereby provide a datum related to the density and volume of hay present in the density-control chamber 24. Alternatively, load cells capable of measuring the torque absorbed or exerted by a rotating member may be used to provide a datum for use in controlling the operation of the hay baler 10.

Figure 3B:
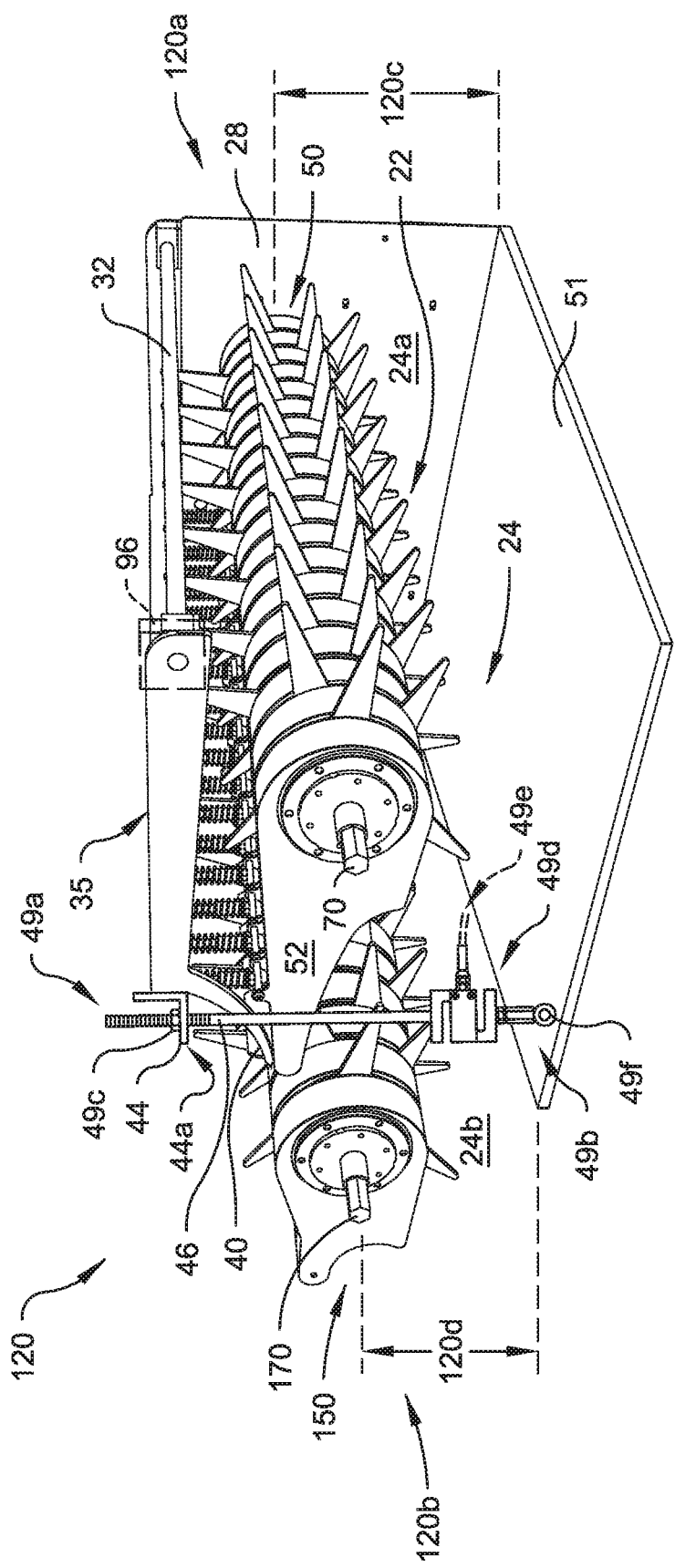
FIG. 3B is a partial left front perspective view of an alternative density-control stage for a hay baler, with one wall plate omitted.
Figure 4:
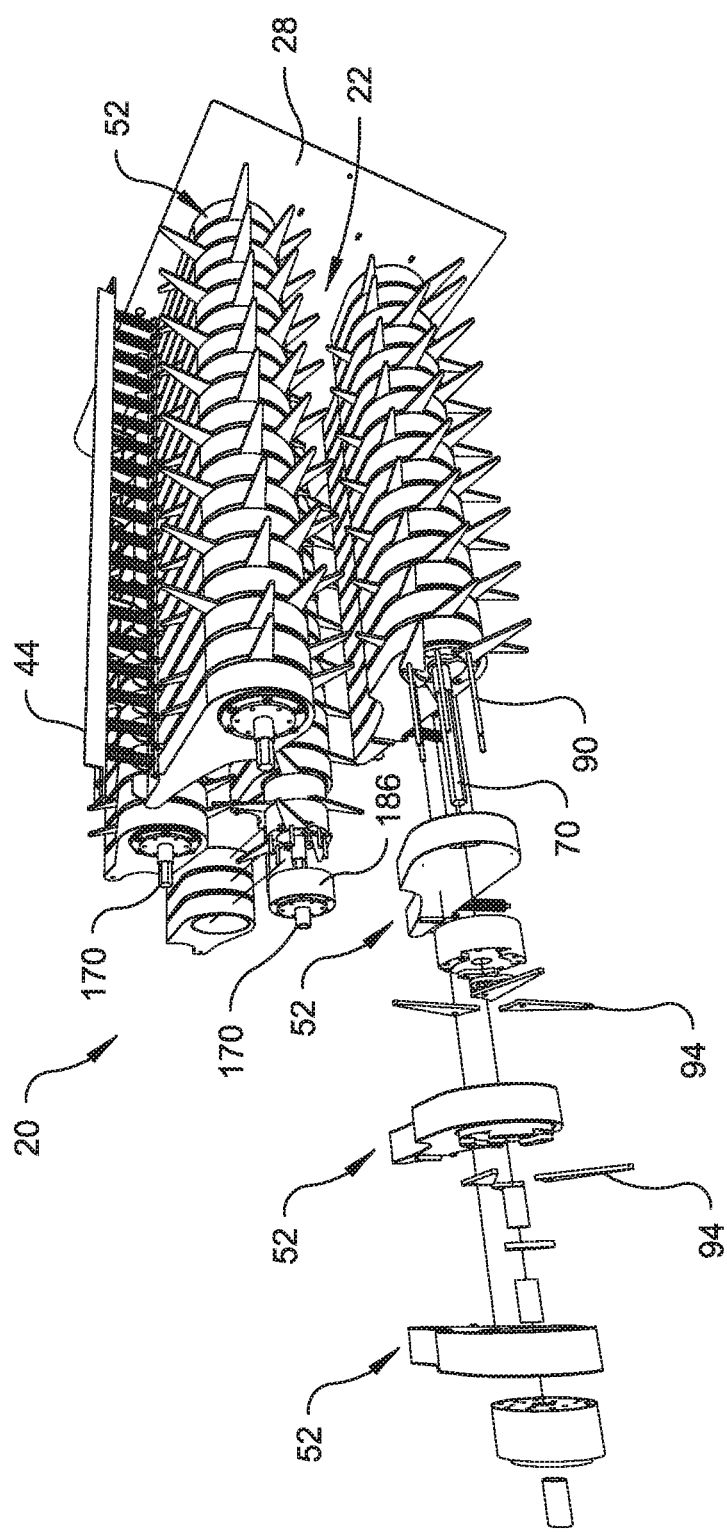
FIG. 4 is a partially exploded partial front left perspective view of the density-control stage of the hay baler of FIG. 1.
Figure 5:
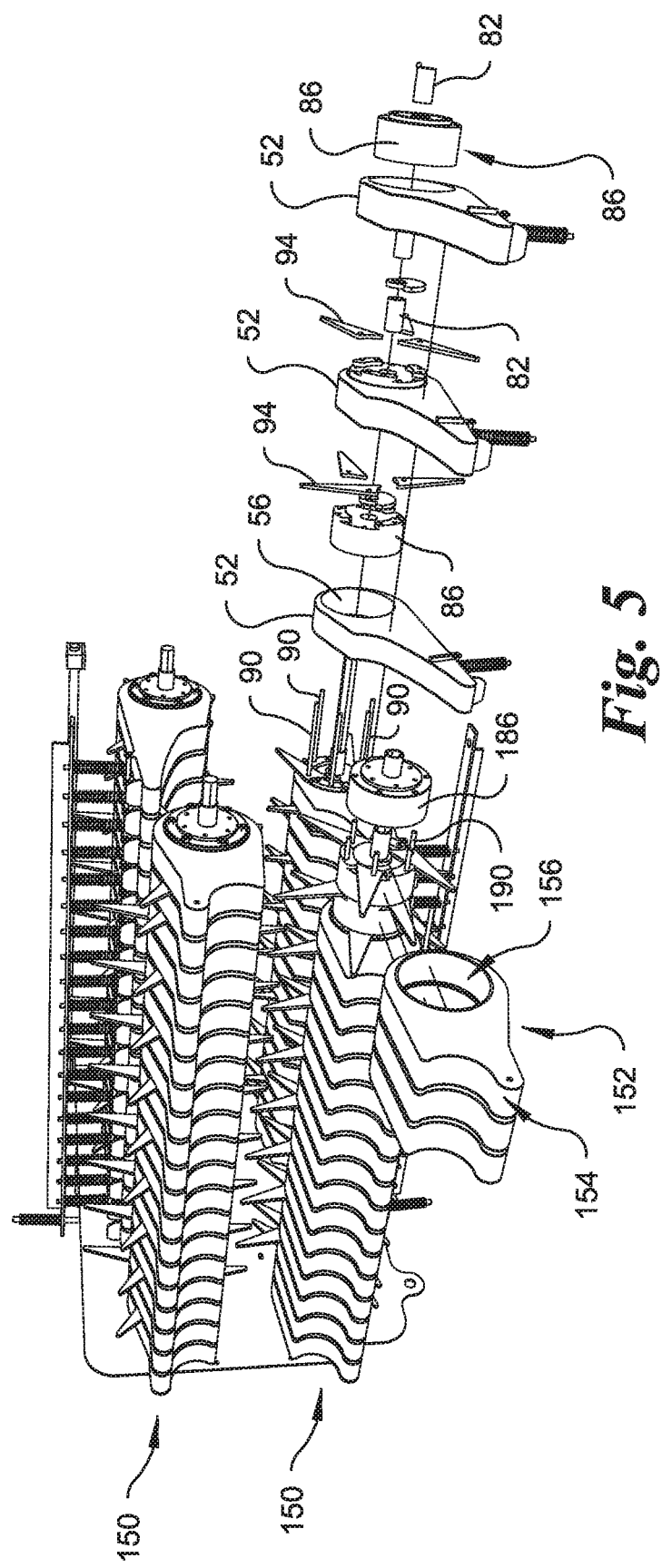
FIG. 5 is a partially exploded partial rear left perspective view of the density-control stage of the hay baler of FIG. 1.
Figure 6:
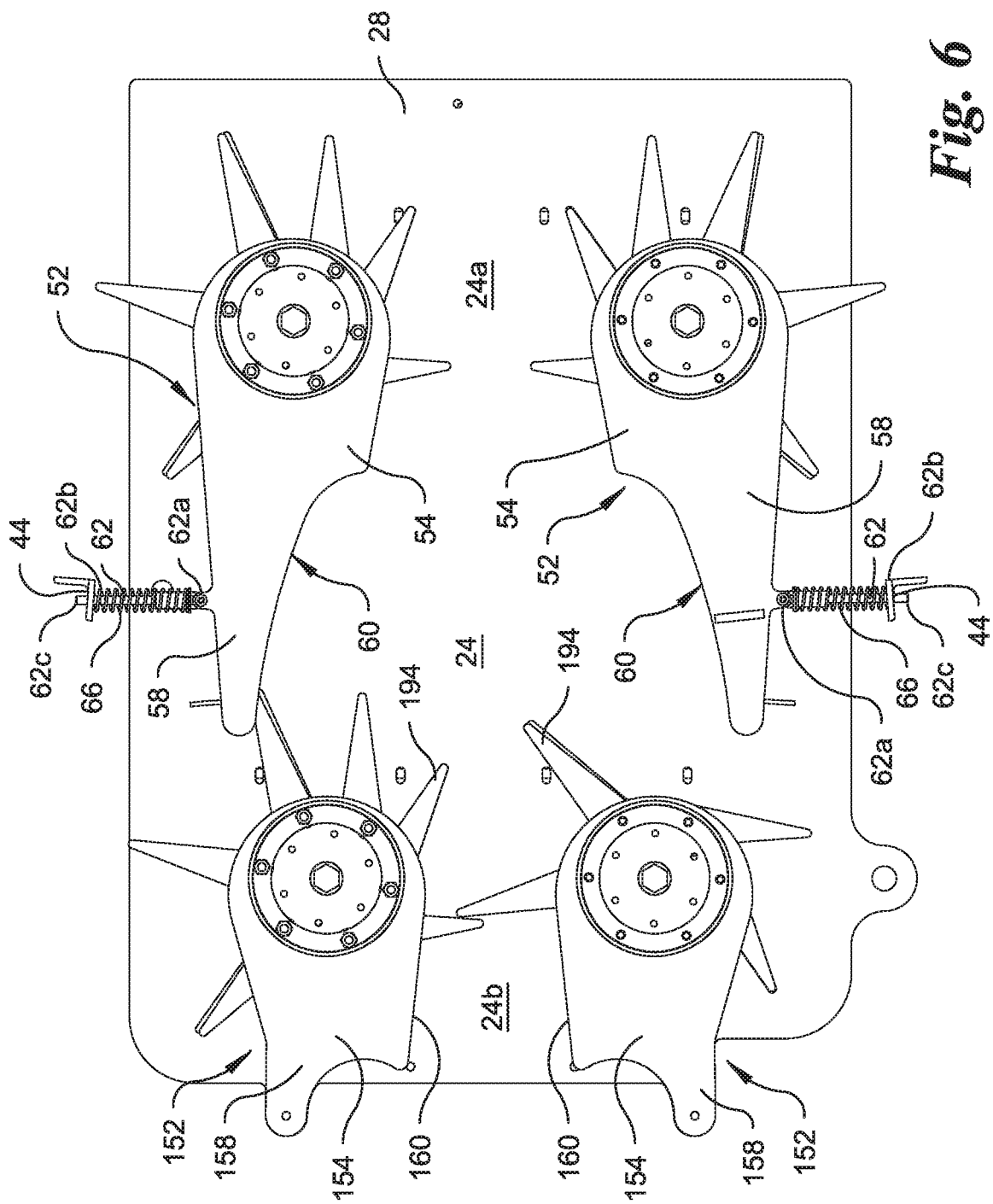
FIG. 6 is a left side elevational view of the density-control stage of the hay baler of FIG. 1, with a wall plate omitted from the left side thereof.
Figure 7:
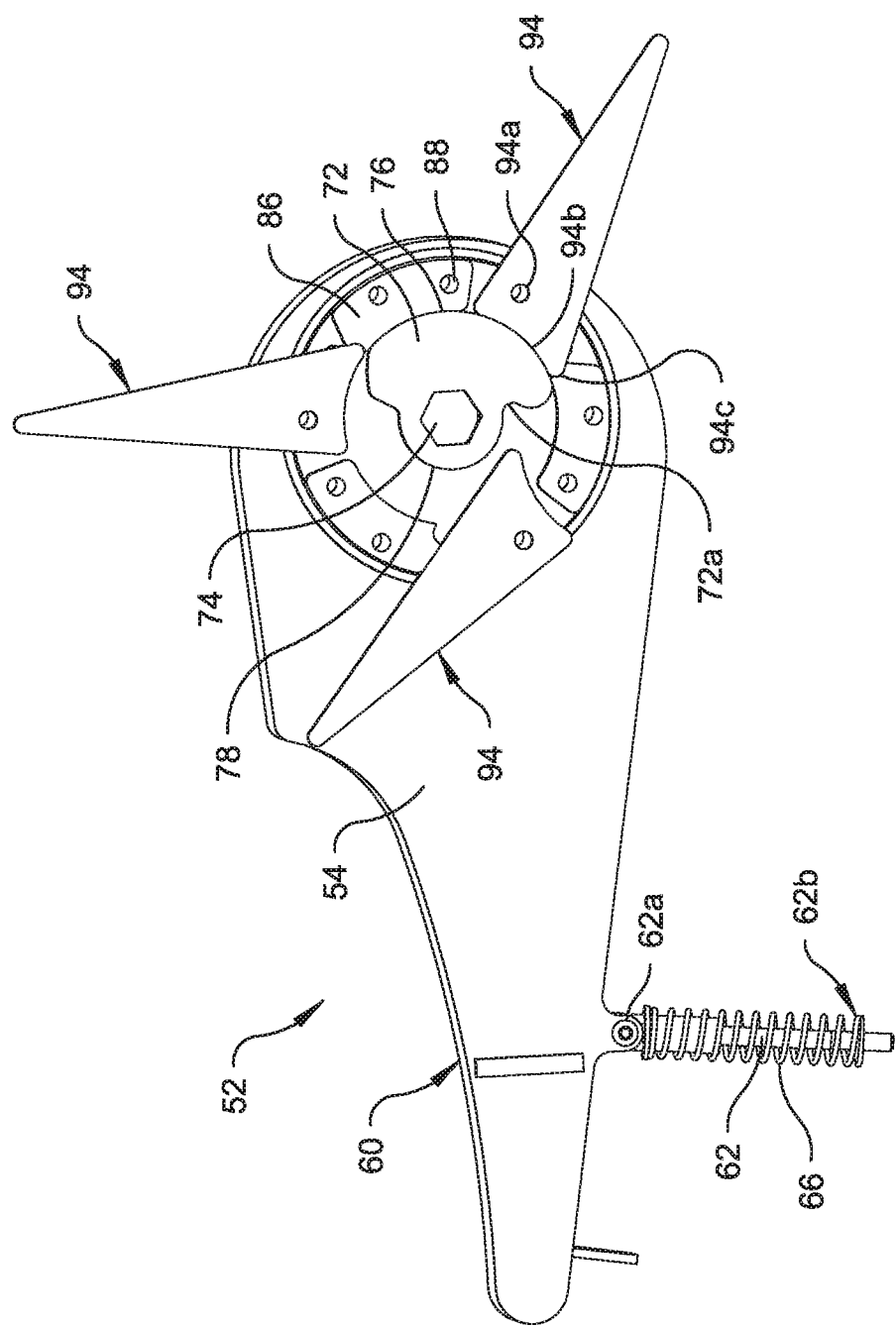
FIG. 7 is a side elevational view of an arm and a carrier of the density-control stage of the hay baler of FIG. 1.

Referring to FIG. 3B, a simplified density-control stage 120 having an upstream end 120*a* and a downstream end 120*b* is disclosed. As in FIG. 3, a wall plate 28 is omitted to allow a view of the interior of the simplified density-control stage 120. The simplified density-control stage 120 shares components in common with the density-control stage 20, with like reference numbers corresponding to identical components, which are described elsewhere herein. However, the simplified density-control stage 120 omits the second density-control assembly 50 and the second transfer assembly 150, and related components, in favor of a support surface, in this embodiment, a flat plate 51. The first, second, third, and fourth exterior members 34*a*, 34*b*, 34*c*, and 34*d* are omitted and replaced with a truncated exterior member 35 on each side of the compression chamber 24. Each truncated exterior member is connected to and supports the transverse tying member 44 and is connected to a pin member 32. A load-cell-carrier rod 49 has a first end 49*a*, a second end 49*b*, a load cell 49*d*, a connection 49*e*, and a hole 49*f* for a bolt or other fastener, so that the rod 49 may be secured to a wall plate 28 (not shown) or another support structure. The load cell 49*d* and/or a detector 96 function as described above to detect at least one datum related to the density and volume of hay present in the density-control chamber 24 so that compatible speeds of operation for at least one of the transfer assembly 152 and the compression stage 250 are selected. In the simplified density-control stage 120, the first offset distance 120*c* is measured from the center of the shaft 70 to the support surface 51, and the second offset distance 120*d* is measured from the center of the shaft 170 to the support surface 51. The first offset distance 120*c* is preferably greater than the second offset distance 120*d* so that hay undergoes a compression when passing from the upstream end 120*a* of the simplified density-control stage to the downstream end 120*b*.

In use, the density-control stage 20 collects a mass of hay of a desired volume and density and then activates the compression stage 250 and the transfer assemblies 150, introducing the mass of hay into the compression stage 250. As the transfer assemblies 150 propel hay from the density-control chamber 24 into the compression stage 250, the frame biasing members, the springs 48, optionally rotate at least one of the exterior members 34*a*, 34*b*, 34*c*, 34*d* in a return motion back to a position corresponding to a lower volume or density (or both) of hay. In response to the return motion, at least one position detector 96 directly or indirectly (through a controller 98) deactivates or slows the operation of the transfer assemblies 150 and the compression stage 250.

The entire density-control stage 20 thus effectively operates as a control system to ensure that hay of an appropriate density and volume is supplied to the compression stage 250 and that the compression stage 250 operates at a speed compatible with the available hay supply. This allows the hay baler 10 to operate continuously as the hay baler 10 moves across a field having a typically varied distribution of hay for baling, or as the hay baler hay receives a supply of hay in a stationary application. The hay baler 10 as a result preferably operates as a continuous-flow, high-capacity baler producing bales of consistent size and shape.

Referring to FIGS. 1, 2, and 14, the compression stage 250 is located downstream or rearward of the density-control stage 20 and is positioned to accept hay moved downstream from the density-control stage 20 by the transfer assemblies 150.

Figure 8:
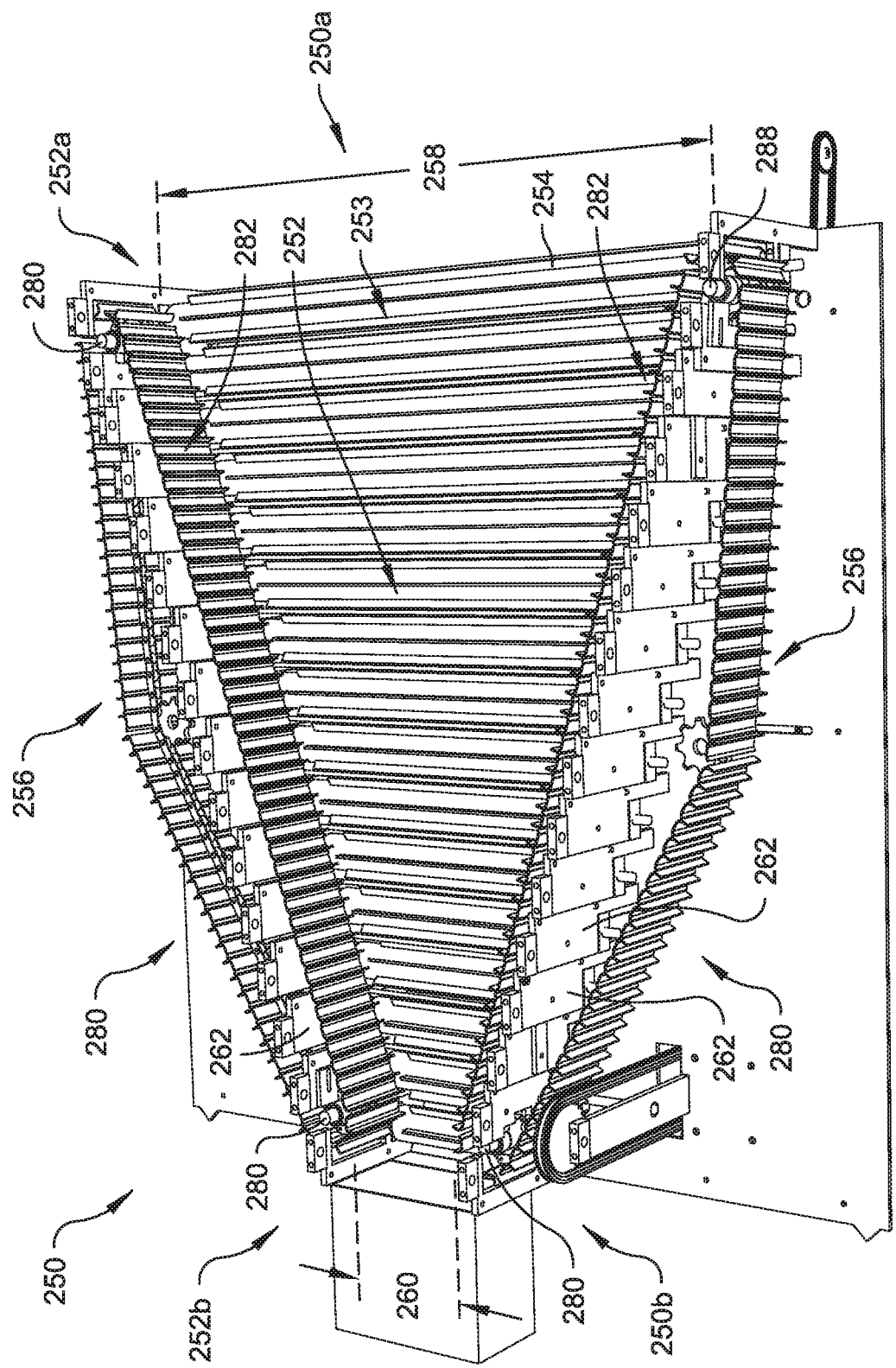
FIG. 8 is partial left upper perspective view of a compression stage of the hay baler of FIG. 1, with an upper set of rollers omitted.
Figure 8A:
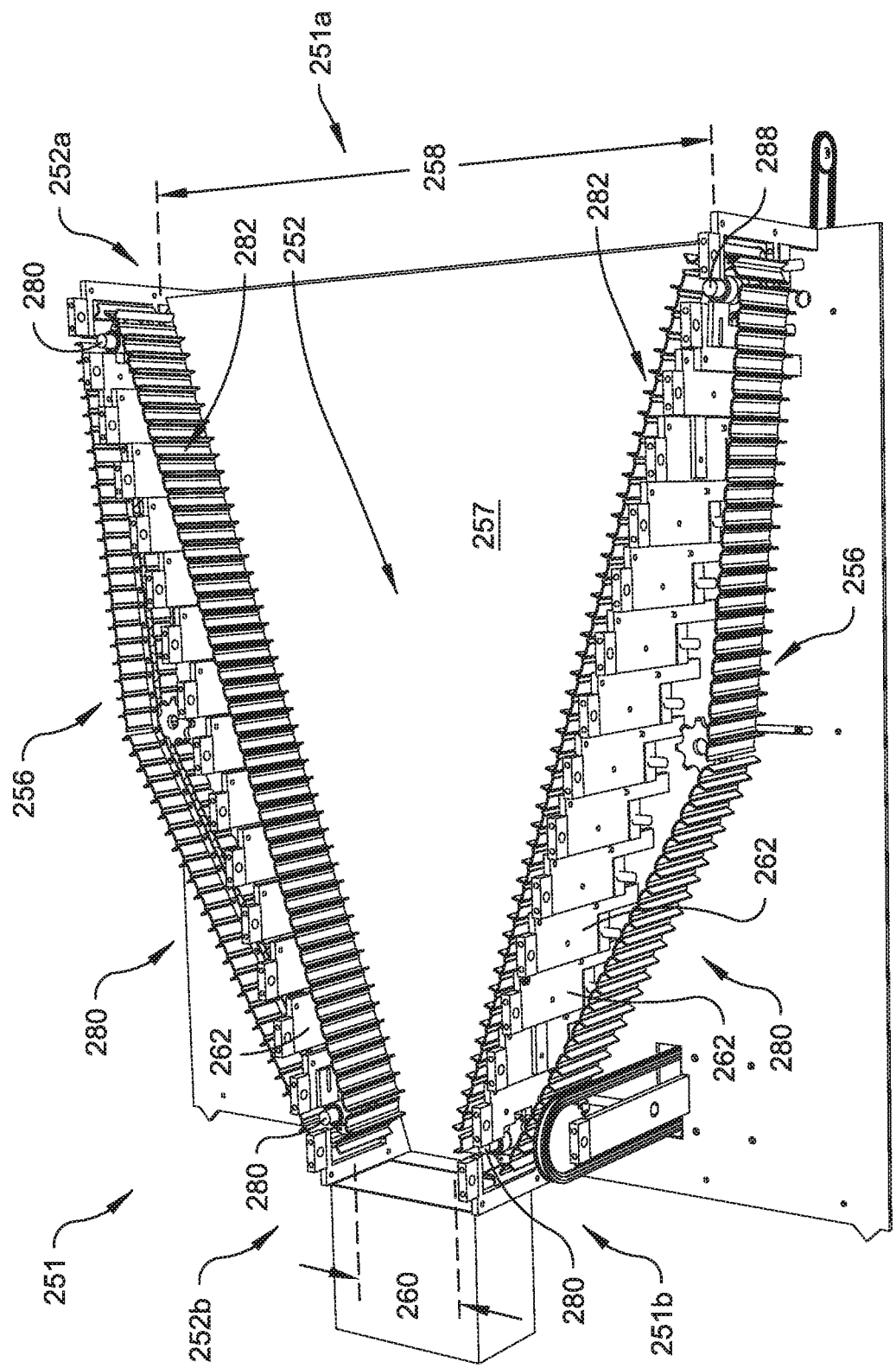
FIG. 8A is a partial left upper perspective view of a compression stage for a hay baler, with an upper set of rollers omitted.
Figure 9:
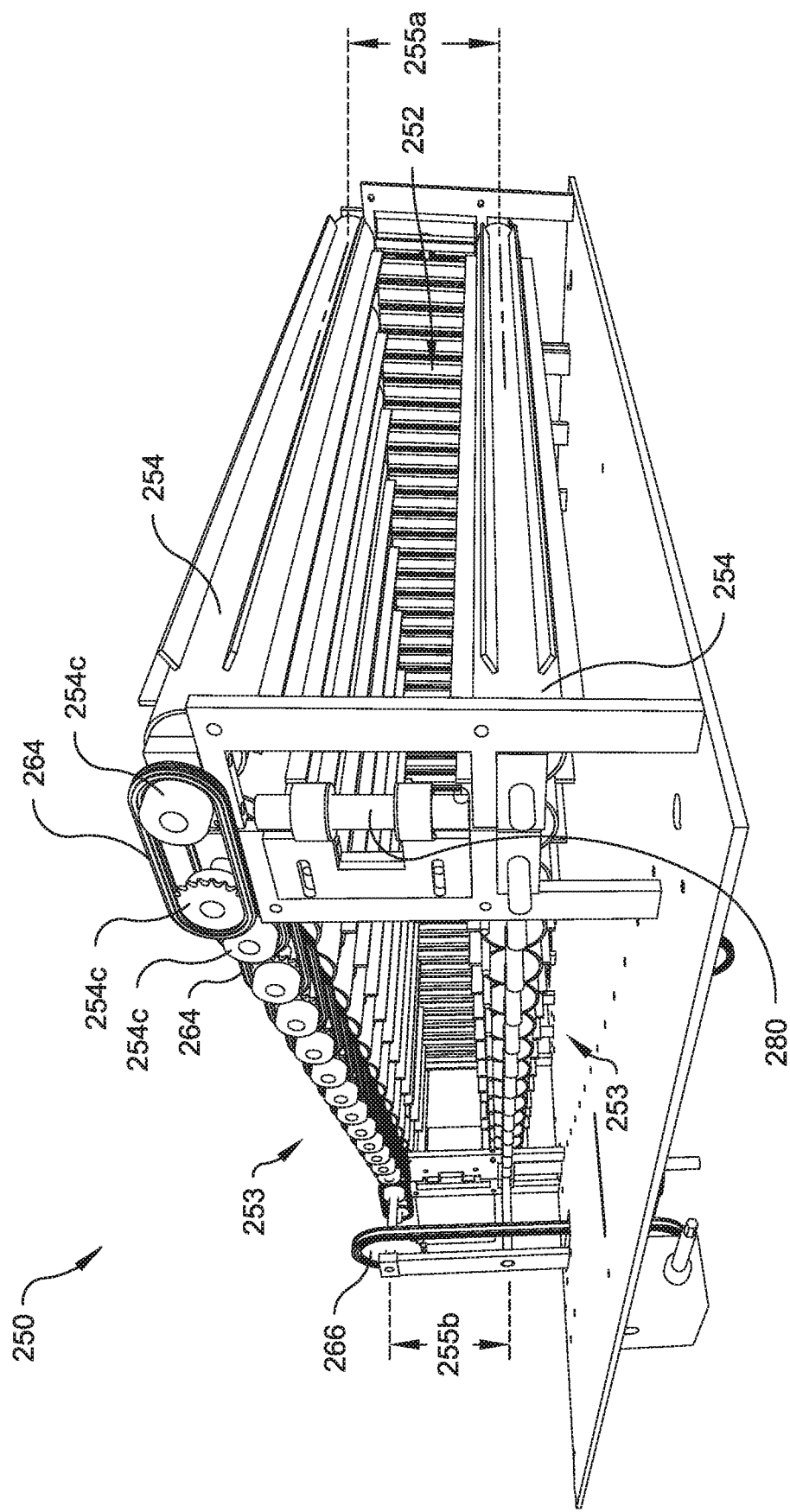
FIG. 9 is a left front perspective view of the compression stage of FIG. 8, with a vertical conveyor omitted.
Figure 10:
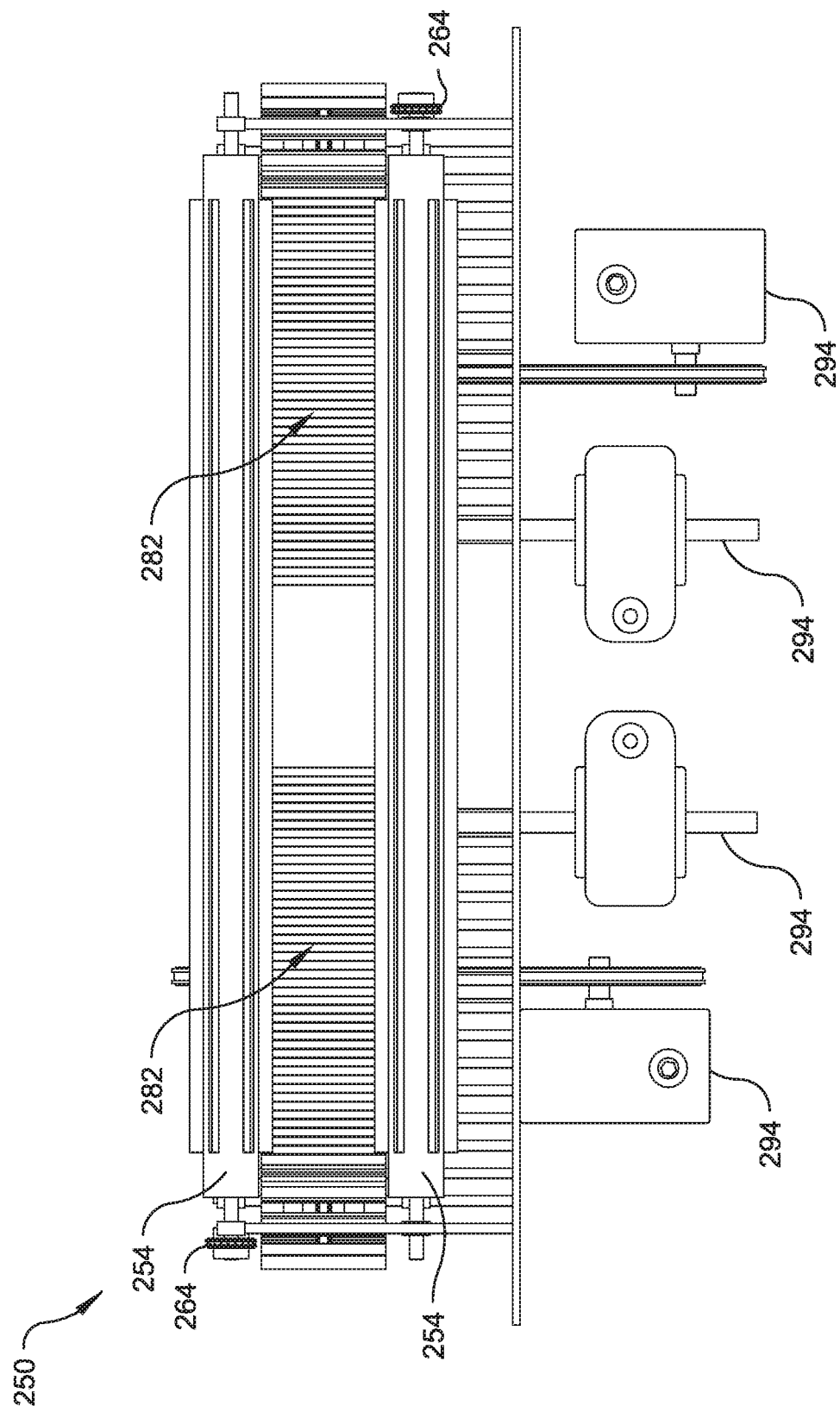
FIG. 10 is a front view of the compression stage of FIG. 8 of the hay baler of FIG. 1.
Figure 11:
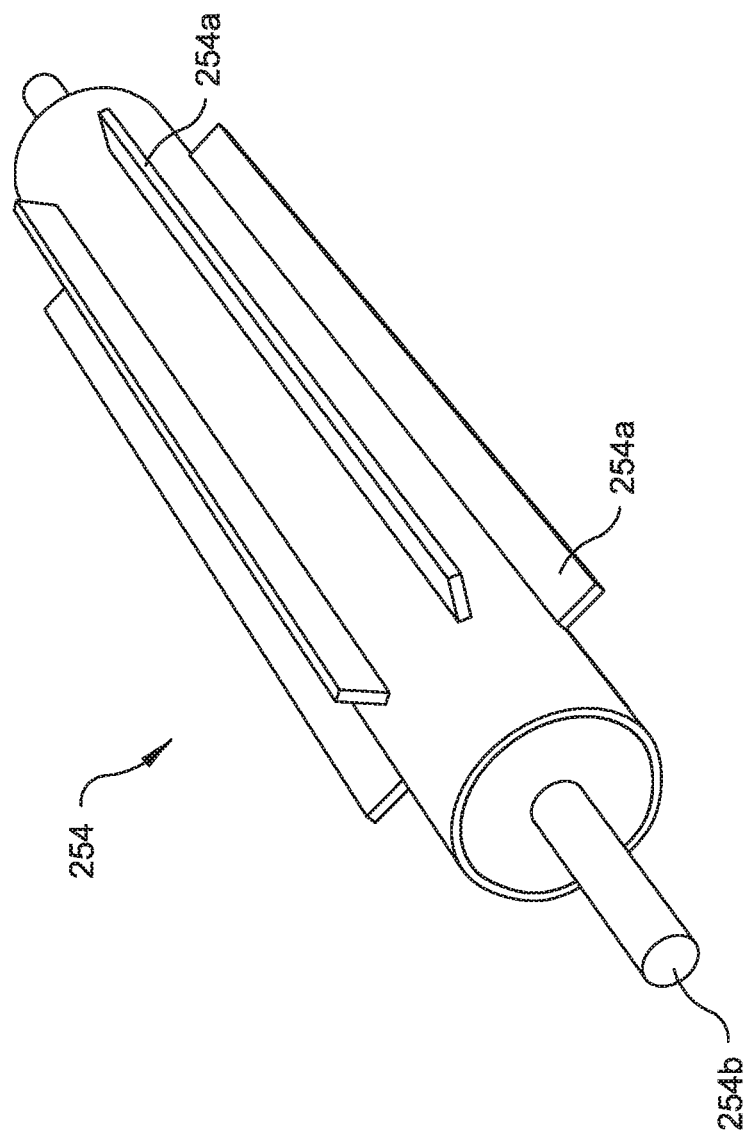
FIG. 11 is a perspective view of a roller of the compression stage of FIG. 8 of the hay baler of FIG. 1.

Referring to FIGS. 8 and 9-13, the compression stage 250 includes a compression chamber 252 formed by a first and a second major wall conveying means 253, each including a plurality of rollers 254 oriented in a plane, and by a first and a second sidewall conveying means, each including a sidewall conveyor 256, which may be any conveyor device suitable for propelling hay. Preferably the first major wall conveying means 253, the second major wall conveying means 253, the first sidewall conveying means (sidewall conveyor 256), and the second sidewall conveying means (sidewall conveyor 256) are driven at compatible speeds to cooperate to accept hay introduced into the upstream end 252*a* of the compression stage 250 and to discharge the hay in a compressed form from the downstream end 250*b* of the compression stage 250. The sidewall conveyors 256 are transversely oriented, perpendicularly to the major wall conveying means 253. The first major wall conveying means 253, the second major wall conveying means 253, the first sidewall conveying means (sidewall conveyor 256), and the second sidewall conveying means (sidewall conveyor 256) are driven at compatible speeds to cooperate to accept hay introduced into the upstream end 250*a* of the compression stage 250 and to discharge the hay in a compressed form from the downstream end 250*b* of the compression stage 250*b* The first major wall conveying means 253 and the second major wall conveying means 253 are adapted to propel hay and driven to propel hay from the upstream end 252a of the compression chamber 252 to the downstream end 252b. The first and second sidewall conveyors 256 form a first and a second side wall of the compression chamber 252 and are adapted to propel hay (by having surface characteristics as are known in the art to be suitable to propelling hay) and driven to propel hay from the upstream end 252a of the compression chamber 252 to the downstream end 252b, and are angled so that the compression chamber 252 tapers from an initial width 258 at the upstream end 252a to a smaller final width 260 at the downstream end 252b. Each major wall conveying means 253 is adapted to propel hay and driven to propel hay from the upstream end 252a of the compression chamber 252 to the downstream end 252b. The first and second major wall conveying means 253 are in spaced relation to each other and in the embodiment shown are parallel; alternatively, the first and second major wall conveying means 253 are angled so that the compression chamber 252 tapers from an initial major wall conveying means gap 255a at the upstream end 252a to a smaller final major wall conveying means gap 255b at the downstream end 252b (FIG. 8).

Each roller 254 is a cylindrical body with a plurality of axial blades 254a extending radially outwardly therefrom and a central shaft 254b extending therethrough, and the rollers 254 are mounted in closely spaced relation so that the rollers 254 form an essentially continuous boundary and allow little to no hay to escape. The blades 254a are depicted as straight, symmetrical longitudinal bodies, but other blade shapes—for example, curved or asymmetrical shapes—are possible as long as the rollers 254 fit together sufficiently and are effective in propelling hay. The rollers 254 are supported by a plurality of vertically oriented frame elements 262, which are best seen in FIG. 8, where the upper rollers 254 are omitted; in FIG. 9, the frame elements 262 of the left side are omitted. Preferably the rollers 254 are selected in varying lengths so that each roller 254 is no longer than is necessary to form the upper and lower boundaries of the compression chamber 252. In the embodiment shown, the first and second major wall conveying means 253 are formed from the rollers 254, but other conveying means such as a sidewall conveyor 256 may be substituted for the plurality of rollers 254. The first and second sidewall conveying means are sidewall conveyors 256 of a particular configuration as described herein; but other conveying means, such as a plurality of rollers 254 as described herein, or other designs of conveyors having continuous belts or differing in other characteristics may be substituted for the sidewall conveyors 256.

The rollers 254 are preferably driven by a pair of power sources (one on each side of the compression stage 250). With respect to a first roller 254, a roller shaft 254b preferably has a first sprocket 254c and a second sprocket 254c attached thereto. A first chain 264 engages and links together the first sprocket 254c of the first roller 254 and a second sprocket 254c of a neighboring roller 254 in the upstream direction, and a second chain 264 engages the second sprocket 254c of the first roller 254 and a second sprocket 254c of a neighboring roller 254 in the downstream direction. This arrangement allows neighboring rollers 254 to be driven together at matching speeds and to share a common power source, here a motor-driven gearbox 294 driving an input sprocket 266. Alternatively, the rollers 254 may be driven by individual power sources or may be linked in alternative combinations by chains, gears, belts, or other mechanisms.

The rollers 254 and the sidewall conveyors 256 are preferably driven at corresponding speeds so that hay entering the compression stage 252 is preferably compressed and shaped for delivery to a chute 292 (FIG. 1), where cutting and baling is carried out.

Each sidewall conveyor 256 preferably comprises a plurality of links 268a, 268b which are joined together to form a chain. Referring to FIGS. 13A-13C, each link 268a, 268b preferably comprises a body 270 having a longitudinal axis 270a. As best seen in cross section, the body 270 is preferably constructed from a generally flat plate, with the plate being angled to form a base 270b, a minor leg 270c, and a major leg 270d. Each link 268a, 268b includes a pair of carrier plates 272. Each carrier plate 272 has two holes 274, which are preferably located near the front and rear ends thereof. Each link 268a, 268b preferably has a pair of carrier plates 272 in parallel and spaced relation, with the holes 274 in each plate aligned, and with each link 268a, 268b joined to link body 270 to accommodate at least a wheel 276 therebetween. Preferably there are two types of links, 268a, 268b. The first link 268a has two carrier plates 272 spaced sufficiently to accommodate the wheel 276, while the second link 268b has two carrier plates 272 spaced sufficiently widely to accommodate a wheel 276 and the carrier plates 272 of the first link 268a. The first and second links 268a, 268b may be assembled into a chain by alternately connecting the first link 268a and the second link 268b by aligning a pair of front holes 274 of the first link 268a with a pair of rear holes 274 of the second link 268b and inserting a pin 278 though the holes 274 in both links 268a, 268b and a wheel 276, with the pin 278 functions as a shaft for the wheel 276 and a connector joining the links 268a, 268b. In each sidewall conveyor 256, a plurality of alternating links 268a, 268 are connected together to form a continuous chain 280.

Figure 12:
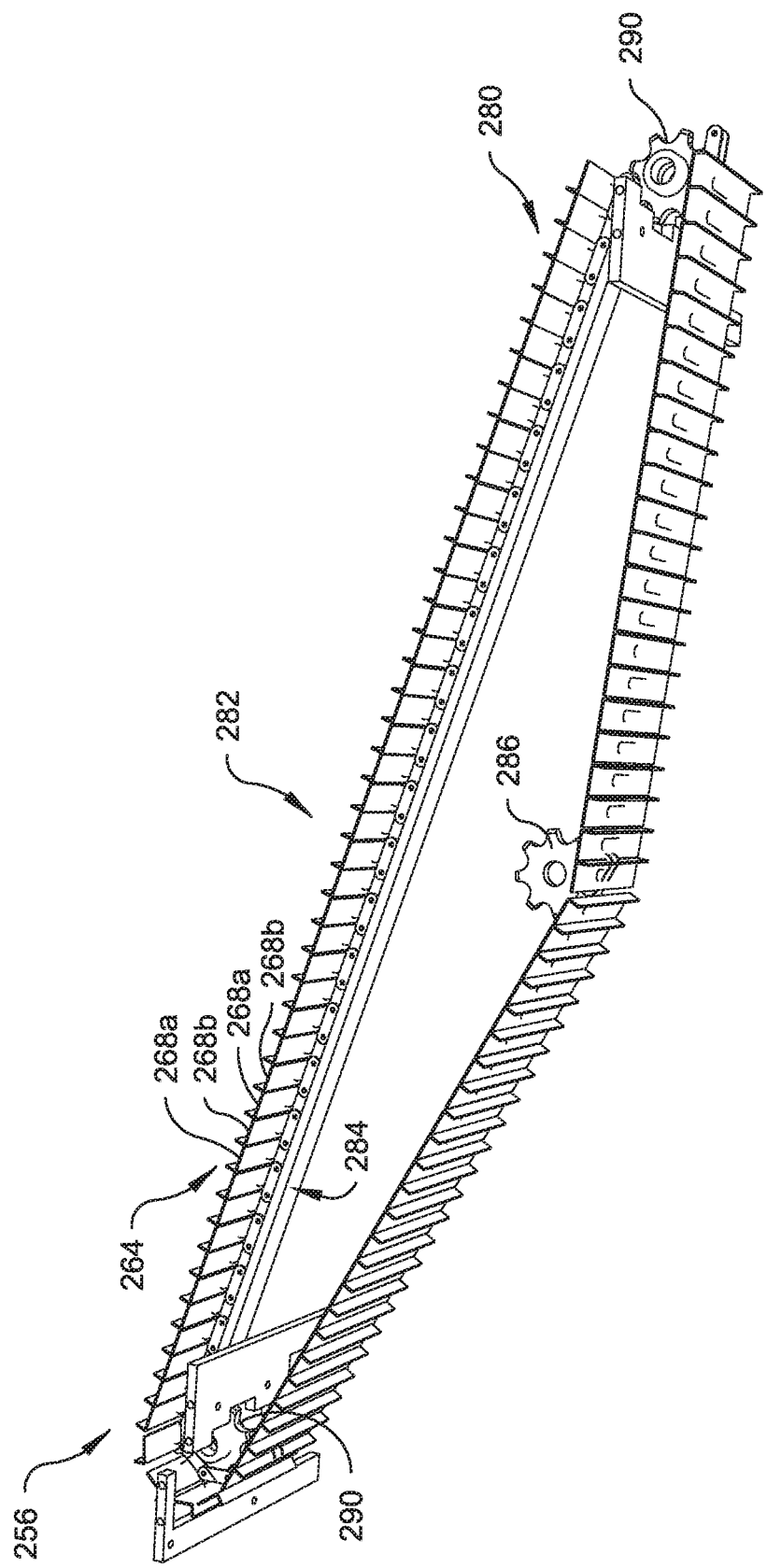
FIG. 12 is a perspective view of a conveyor of the compression stage of FIG. 8 of the hay baler of FIG. 1.

Referring to FIGS. 2 and 12, each chain 280 may held in a generally triangular shape as shown. Alternatively, each chain 280 may take on an oval shape or any other convenient shape. In the embodiment shown, one side of the triangle, a pressure side 282 of the chain 280 forms a side of the compression chamber 252, and the chain 280 is preferably supported along the pressure side 282, which forms a sidewall of the compression chamber 252, by a pressure track 284 that engages the wheels 276 of the plurality of links 268a, 268b. An idler sprocket 286 maintains tension in the chain 280 and, in the embodiment shown, deforms the chain 280 into the generally triangular shape mentioned above. Each chain 280 is driven at a speed corresponding to the speed of the rollers 254 by one or more power sources preferably driving a pair of drive shafts 288 (FIGS. 8 and 9) carrying drive sprockets 290 (FIG. 12) for each chain 280.

In a preferred embodiment, the compression stage 250 includes rollers 254 and sidewall conveyors 256. A compression chamber 252 may also be formed by orienting the rollers 254 vertically and configuring the rollers in a shape tapering inwardly in the downstream direction, with the top and bottom of the compression chamber formed with sidewall conveyors 256 oriented horizontally. Alternatively, a compression chamber 252 may be formed by major wall conveying means and sidewall conveyor means including any combination of rollers 254 and sidewall conveyors 256.

An alternative compression stage 251 has an upstream end 251a and a downstream end 251b. The alternative compression stage 251 is similar to the compression stage 250 described above and shares components in common with the compression stage 250, with like reference numbers corresponding to identical components, which are described elsewhere herein. However, in the alternative compression stage 251, a major wall conveying means 253 is replaced by a support surface, in this case a flat support surface 257, which optionally may be the same surface as the surface on which the alternative compression stage 251 rests, or which optionally may be a portion of the same surface as the support surface 51 of the simplified density-control stage 120. The remaining components of the alternative compression stage 251 are as described above with respect to the compression stage 250.

The hay baler 10 preferably cuts and binds the compressed hay 'on the fly' by a mechanism that operates in coordination with the stream of compressed hay as it leaves the chute 292, and that resets its position in order to cut the next bale at the correct distance from the previous cut.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

I claim:

1. A hay baler comprising:
   a compression stage having an upstream end and a downstream end and including a first major wall conveying means, a second major wall conveying means, a first sidewall conveying means, and a second sidewall conveying means, the first major wall conveying means, the second major wall conveying means, the first sidewall conveying means, and the second sidewall conveying means being arranged to form and surround a compression chamber, with the first major wall conveying means, the second major wall conveying means, the first sidewall conveying means, and the second sidewall conveying means extending from an upstream end of the compression chamber to a downstream end thereof, wherein
   the first major wall conveying means is adapted to propel hay and driven to propel hay from the upstream end of the compression chamber to the downstream end;
   the second major wall conveying means is adapted to propel hay and driven to propel hay from the upstream end of the compression chamber to the downstream end;
   the first major wall conveying means is in spaced relation to the second major wall conveying means in either a parallel spaced orientation in which the first and second major wall conveying means are parallel to each other, or a tapering spaced orientation in which the first and second major wall conveying means are angled so that the compression chamber tapers from an initial major wall conveying means gap at the upstream end to a smaller final major wall conveying means gap at the downstream end;
   the first sidewall conveying means is transversely oriented and forms a first vertical side wall of the compression chamber and is driven to propel hay from the upstream end of the compression chamber to the downstream end;
   the second sidewall conveying means is transversely oriented and forms a second vertical side wall of the compression chamber and is driven to propel hay from the upstream end of the compression chamber to the downstream end;
   the first sidewall conveying means and the second sidewall conveying means are angled toward one another so that the compression chamber tapers from an initial width at the upstream end of the compression chamber to a smaller final width at the downstream end; and
   the first major wall conveying means, the second major wall conveying means, the first sidewall conveying means, and the second sidewall conveying means are driven at compatible speeds to cooperate to accept hay introduced into the upstream end of the compression stage and to discharge the hay in a compressed form from the downstream end of the compression stage, and
   wherein the first major wall conveying means defines a top wall of the compression chamber, the second major wall conveying means located below the first major wall conveying means, the second major wall conveying means defines a bottom wall of the compression chamber, the first vertical side wall of the compression chamber extends between the top wall and the bottom wall, the second vertical side wall of the compression chamber extends between the top wall and the bottom wall, and the top and bottom walls extend from the first vertical side wall to the second vertical side wall.

2. The hay baler according to claim 1, wherein
   the first major wall conveying means comprises a plurality of rollers oriented in a plane, each roller being adapted to propel hay and driven to propel hay from the upstream end of the compression chamber to the downstream end;
   the second major wall conveying means comprises a plurality of rollers oriented in a plane, each roller being adapted to propel hay and driven to propel hay from the upstream end of the compression chamber to the downstream end;
   the first sidewall conveying means comprises a first sidewall conveyor adapted to propel hay and driven to propel hay from the upstream end of the compression chamber to the downstream end;
   the second sidewall conveying means comprises a second sidewall conveyor adapted to propel hay and driven to propel hay from the upstream end of the compression chamber to the downstream end;
   and the first sidewall conveyor and the second sidewall conveyor are angled so that the compression chamber tapers from an initial width at the upstream end to a smaller final width at the downstream end; and
   the rollers of the first major sidewall conveying means, the rollers of the second major sidewall conveying means, the first sidewall conveyor, and the second sidewall conveyor are driven an compatible speeds to cooperate to accept hay introduced into the upstream end of the compression stage and to discharge the hay in a compressed form from the downstream end of the compression stage.

3. The hay baler according to claim 2, wherein at least one roller of the plurality of rollers of the first major wall conveying means comprises a cylindrical body with a plurality of axial blades extending radially outwardly therefrom.

4. The hay baler according to claim 2, wherein the rollers of the plurality of rollers of the first major wall conveying means are mounted in closely spaced relation to form an essentially continuous boundary of the compression chamber through which boundary little hay escapes.

5. The hay baler according to claim 1, further comprising:
   a density-control stage operatively connected to the upstream end of the compression stage, the density-control stage having an upstream end and a downstream end and including
   a frame having a base and two spaced-apart parallel
   frame elements attached to the base,
a first density-control assembly,
a second density-control assembly,
a first transfer assembly,
a second transfer assembly, and
a density-control chamber formed by a space between
   the first density-control assembly and the second
   density-control assembly and having an upstream
   end and a downstream end,
the first density-control assembly including
   a first transverse arm-support member supporting at
      least one density-control arm, each density-control
      arm being pivotably mounted to the first transverse
      arm-support member and having a hay-contact surface facing the density-control chamber, and
   a means for propelling hay toward the downstream end
      of the density-control chamber,
the second density-control assembly including
   a second transverse arm-support member supporting at
      least one density-control arm, each density-control
      arm being pivotably mounted to the second transverse arm-support member and having a hay-contact
      surface facing the density-control chamber, and
   a means for propelling hay toward the downstream end
      of the density-control chamber,
the first transfer assembly including
   a third transverse arm-support member supporting at
      least one, transfer arm, each transfer arm being
      pivotably mounted to the third transverse arm-support member, and
   a means for propelling hay toward the compression
      stage,
the second transfer assembly including
   a fourth transverse arm-support member supporting at
      least one transfer arm, each transfer arm being pivotably mounted to the fourth transverse arm-support
      member, and
   a means for propelling hay toward the compression
      stage, the hay baler further comprising
   a detector configured to detect a datum indicative of a
      volume and a density of hay in the density-control
      chamber and operatively connected to at least one of
      the transfer assemblies and to the compression stage
      to cause the transfer assembly and the compression
      stage to each operate at a selected speed corresponding to the datum.

6. The hay baler according claim 5, wherein
the first density-control assembly includes a plurality of
   rotating fingers that are alternately locked in an outward orientation for a portion of a revolution and
   alternately unlocked to rotate freely in order to propel
   hay toward the rear end of the compression chamber,
the second density-control assembly includes a plurality
   of rotating fingers that are alternately locked in an
   outward orientation for a portion of a revolution and
   alternately unlocked to rotate freely in order to propel
   hay toward the rear end of the compression chamber,
the first transfer assembly includes a plurality of rotating
   fingers that are alternately locked in an outward orientation for a portion of a revolution and alternately
   unlocked to rotate freely in order to propel hay toward
   the rear end of the compression chamber, and
the second transfer assembly includes a plurality of rotating fingers that are alternately locked in an outward
   orientation for a portion of a revolution and alternately
   unlocked to rotate freely in order to propel hay toward
   the rear end of the compression chamber.

7. The hay baler according to claim 1, further comprising:
a density-control stage having
   an upstream end and a downstream end and including
      a frame having a base and two spaced-apart parallel
      frame elements attached to the base,
   a density-control assembly,
   a transfer assembly,
   a support surface, and
   a density-control chamber formed by a space between
      the density-control assembly and the support surface
      and having an upstream end and a downstream end,
   the density-control assembly including
      a first transverse arm-support member supporting at
         least one density-control arm, each density-control arm being pivotably mounted to the first
         transverse arm-support member and having a hay-contact surface facing the density-control chamber, and
      a means for propelling hay toward the downstream
         end of the density-control chamber,
   the support surface being adapted to have low resistance
      to a movement of hay in contact therewith, and
   the transfer assembly including
      a second transverse arm-support member supporting at
         least one transfer arm, each transfer arm being pivotably mounted to the second transverse arm-support
         member, and
      a means for propelling hay toward a compression stage,
         the hay baler further comprising
   a detector configured to detect a datum indicative of a
      volume and a density of hay in the density-control
      chamber and operatively connected to the transfer
      assembly to cause the transfer assembly to operate at a
      selected speed corresponding to the datum.

8. The hay baler according to claim 2, wherein at least one
of the first sidewall conveyor and the second sidewall
conveyor comprises a plurality of links joined together to
form a chain, with each link comprising a body having a
base, a minor leg angled with respect to the base, and a major
leg angled with respect to the base.

9. The hay baler according to claim 2 wherein at least one
of the first sidewall conveyor and the second sidewall
conveyor is held in a shape having a pressure side facing the
compression chamber, and the pressure side of the conveyor
is supported by a pressure track.

10. The hay baler according to claim 1, further comprising:
a density-control stage having
   an upstream end and a downstream end and including
      a frame having a base and two spaced-apart parallel
      frame elements attached to the base,
   a first density-control assembly,
   a second density-control assembly,
   a first transfer assembly,
   a second transfer assembly, and
   a density-control chamber formed by a space between
      the first density-control assembly and the second
      density-control assembly and having an upstream
      end and a downstream end,
   the first density-control assembly including
      a first transverse arm-support member supporting at
         least one density-control arm, each density-control arm being pivotably mounted to the first transverse arm-support member and having a hay-contact surface facing the density-control chamber, and
a means for propelling hay toward the downstream end of the density-control chamber,
the second density-control assembly including
a second transverse arm-support member supporting at least one density-control arm, each density-control arm being pivotably mounted to the second transverse arm-support member and having a hay-contact surface facing the density-control chamber,
a means for propelling hay toward the downstream end of the density-control chamber,
the first transfer assembly including
a third transverse arm-support member supporting at least one transfer arm, each transfer arm being pivotably mounted to the third transverse arm-support member, and
a means for propelling hay toward the compression stage, the second transfer assembly including
a fourth transverse arm-support member supporting at least one transfer arm, each transfer arm being pivotably mounted to the fourth transverse arm-support member, and
a means for propelling hay toward the compression stage, the hay baler further comprising
a detector configured to detect a datum indicative of a volume and a density of hay in the density-control chamber and operatively connected to at least one of the transfer assemblies to cause the transfer assembly to operate at a selected speed corresponding to the datum.

11. A hay baler comprising:
a compression stage having an upstream end and a downstream end and including a first major wall conveying means, a support surface, a first sidewall conveying means, and a second sidewall conveying means, the first major wall conveying means, the support surface, the first sidewall conveying means, and the second sidewall conveying means being arranged to form a compression chamber having an upstream end and a downstream end, wherein
the first major wall conveying means is adapted to propel hay and driven to propel hay from the upstream end of the compression chamber to the downstream end;
the surface is adapted to have low resistance to a movement of hay in contact therewith;
the first major wall conveying means is in spaced relation to the support surface in either a parallel spaced orientation in which the first major wall conveying means and the support surface are parallel to each other, or a tapering spaced orientation in which the first major wall conveying means and the support surface are angled so that the compression chamber tapers from an initial major wall conveying means to support surface gap at the upstream end to a smaller final major wall conveying means to support surface gap at the downstream end,
the first sidewall conveying means is transversely oriented and forms a first side wall of the compression chamber and is driven to propel hay from the upstream end of the compression chamber to the downstream end;
the second sidewall conveying means is transversely oriented and forms a second side wall of the compression chamber and is driven to propel hay from the upstream end of the compression chamber to the downstream end;
and the first sidewall conveying means and the second sidewall conveying means are angled so that the compression chamber tapers from an initial width at the upstream end of the compression chamber to a smaller final width at the downstream end; and
the first major wall conveying means, the first sidewall conveying means, and the second sidewall conveying means are driven at compatible speeds to cooperate to accept hay introduced into the upstream end of the compression stage and to discharge the hay in a compressed form from the downstream end of the compression stage;
wherein the first major wall conveying means comprises a plurality of rollers oriented in a plane, each roller being adapted to propel hay and driven to propel hay from the upstream end of the compression chamber to the downstream end;
the first sidewall conveying means comprises a first sidewall conveyor adapted to propel hay and driven to propel hay from the upstream end of the compression chamber to the downstream end;
the second sidewall conveying means comprises a second sidewall conveyor adapted to propel hay and driven to propel hay from the upstream end of the compression chamber to the downstream end;
and the first sidewall conveyor and the second sidewall conveyor are angled so that the compression chamber tapers from an initial width at the upstream end to a smaller final width at the downstream end; and
the rollers of the first major sidewall conveying means, the first sidewall conveyor, and the second sidewall conveyor are driven at compatible speeds to cooperate to accept hay introduced into the upstream end of the compression stage and to discharge the hay in a compressed form from the downstream end of the compression stage; and
wherein at least one of the first sidewall conveyor and the second sidewall conveyor comprises a plurality of links joined together to form a chain, with each link comprising a body having a base, a minor leg angled with respect to the base, and a major leg angled with respect to the base.

12. The hay baler according to claim 11, wherein at least one conveyor of the first sidewall conveyor and the second sidewall conveyor is held in a shape having a pressure side facing the compression chamber, and the pressure side of the at least one conveyor is supported by a pressure track.

13. The hay baler according to claim 11, further comprising:
a density-control stage operatively connected to the upstream end of the compression stage, the density-control stage having
an upstream end and a downstream end and including
a frame having a base and two spaced-apart parallel frame elements attached to the base,
a first density-control assembly,
a second density-control assembly,
a first transfer assembly,
a second transfer assembly, and
a density-control chamber formed by a space between the first density-control assembly and the second density-control assembly and having an upstream end and a downstream end,
the first density-control assembly including
a first transverse arm-support member supporting at least one density-control arm, each density-control arm being pivotably mounted to the first transverse arm-support member and having a hay-contact surface facing the density-control chamber, and
a means for propelling hay toward the downstream end of the density-control chamber,
the second density-control assembly including
a second transverse arm-support member supporting at least one density-control arm, each density-control arm being pivotably mounted to the second transverse arm-support member and having a hay-contact surface facing the density-control chamber, and
a means for propelling hay toward the downstream end of the density-control chamber,
the first transfer assembly including
a third transverse arm-support member supporting at least one, transfer arm, each transfer arm being pivotably mounted to the third transverse arm-support member, and
a means for propelling hay toward the compression stage,
the second transfer assembly including
a fourth transverse arm-support member supporting at least one transfer arm, each transfer arm being pivotably mounted to the fourth transverse arm-support member, and
a means for propelling hay toward the compression stage, the hay baler further comprising
a detector configured to detect a datum indicative of a volume and a density of hay in the density-control chamber and operatively connected to at least one of the transfer assemblies and to the compression stage to cause the transfer assembly and the compression stage to each operate at a selected speed corresponding to the datum.

14. A hay baler comprising:
a density-control stage having
an upstream end and a downstream end and including a frame having a base and two spaced-apart parallel frame elements attached to the base,
a first density-control assembly,
a second density-control assembly,
a first transfer assembly,
a second transfer assembly, and
a density-control chamber formed by a space between the first density-control assembly and the second density-control assembly and having an upstream end and a downstream end,
the first density-control assembly including
a first transverse arm-support member supporting at least one density-control arm, each density-control arm being pivotably mounted to the first transverse arm-support member and having a hay-contact surface facing the density-control chamber, and
a means for propelling hay toward the downstream end of the density-control chamber,
the second density-control assembly including
a second transverse arm-support member supporting at least one density-control arm, each density-control arm being pivotably mounted to the second transverse arm-support member and having a hay-contact surface facing the density-control chamber,
a means for propelling hay toward the downstream end of the density-control chamber,
the first transfer assembly including
a third transverse arm-support member supporting at least one transfer arm, each transfer arm being pivotably mounted to the third transverse arm-support member, and
a means for propelling hay toward a compression stage,
the second transfer assembly including
a fourth transverse arm-support member supporting at least one transfer arm, each transfer arm being pivotably mounted to the fourth transverse arm-support member, and
a means for propelling hay downstream toward a compression stage,
the hay baler further comprising
a detector configured to detect a datum indicative of a volume and a density of hay in the density-control chamber and operatively connected to at least one of the transfer assemblies to cause the transfer assembly to operate at a selected speed corresponding to the datum.

15. The hay baler according to claim 14, further comprising:
a first transverse pin member extending transversely with respect to the parallel frame elements and extending outwardly of the parallel frame elements,
a second transverse pin member extending transversely with respect to the parallel frame elements and extending outwardly of the parallel frame elements,
a first exterior member and a second exterior member pivotally mounted to the first transverse pin member and located outwardly of the parallel frame elements on opposite sides of the density-control chamber, each exterior member having a vertex, a first portion extending rearwardly from the vertex, a second portion extending perpendicularly to the first portion, and a rear end portion disposed to the rear on the first portion,
a third exterior member and a fourth exterior member pivotally mounted to the second transverse pin member and located outwardly of the parallel frame elements on opposite sides of the density-control chamber, each exterior member having a vertex, a first portion extending rearwardly from the vertex, a second portion extending perpendicularly to the first portion, and a rear end portion disposed to the rear on the first portion,
the first exterior member and the third exterior member being connected by a joint configured so that when the first exterior member rotates such that the second portion of the first exterior member is moving closer to the second portion of the third exterior member, the first exterior member exerts a force on the third exterior member tending to rotate the respective second portions of the first and third exterior members toward one another, and when the first exterior member rotates so that the second portion of the first exterior member is moving farther away from the second portion of the third exterior member, the third exterior member exerts a force on the first exterior member tending to rotate the respective second portions of the first and third exterior members away from one another,
the second exterior member and the fourth exterior member being connected by a joint configured so that when the second exterior member rotates such that the second portion of the second exterior member is moving closer to the second portion of the fourth exterior member, the second exterior member exerts a force on the fourth exterior member tending to rotate the respective second portions of the second and fourth exterior members toward one another, and when the second exterior member rotates so that the second portion of the second exterior member is moving farther away from the second portion of the fourth exterior member, the fourth exterior member exerts a force on the second exterior member tending to rotate the respective second portions of the second and fourth exterior members away from one another, each density-control arm of each first density-control assembly having a protrusion extending in a downstream direction toward the downstream end of the density-control chamber and support link having a first end pivotably attached to the protrusion and a second end attached to a first transverse tying member, each density-control arm of each second density-control assembly having a protrusion extending in a downstream direction toward the downstream end of the density-control chamber and support link having a first end pivotably attached to the protrusion and a second end attached to a second transverse tying member, wherein at least one detector is configured to detect a position of at least one of the first, second, third, and fourth exterior members.

16. The hay baler according to claim 15, further comprising at least one frame biasing member operatively connected to at least one of the first exterior member, the second exterior member, the third exterior member, and the fourth exterior member.

17. The hay baler according to claim 15, wherein a first frame biasing member is operatively connected to at least one of the first exterior member and the second exterior member and to a structure providing support and wherein a second frame biasing member is operatively connected to at least one of the third exterior member and the fourth exterior member and to a structure providing support.

18. A hay baler comprising:

a density-control stage having an upstream end and a downstream end and including a frame having a base and two spaced-apart parallel frame elements attached to the base, a density-control assembly, a transfer assembly, a support surface, and a density-control chamber formed by a space between the density-control assembly and the support surface and having an upstream end and a downstream end, the first density-control assembly including a first transverse arm-support member supporting at least one density-control arm, each density-control arm being pivotably mounted to the first transverse arm-support member and having a hay-contact surface facing the density-control chamber, and a means for propelling hay toward the downstream end of the density-control chamber, the support surface being adapted to have low resistance to a movement of hay in contact therewith, and the transfer assembly including a second transverse arm-support member supporting at least one transfer arm, each transfer arm being pivotably mounted to the second transverse arm-support member, and a means for propelling hay toward a compression stage, the hay baler further comprising a detector configured to detect a datum indicative of a volume and a density of hay in the density-control chamber and operatively connected to the transfer assembly to cause the transfer assembly to operate at a selected speed corresponding to the datum.

* * * * *